March 30, 1937.  E. W. BELLUCHE ET AL  2,075,016
SHEET FEEDING MACHINE
Filed Dec. 21, 1933  25 Sheets-Sheet 1
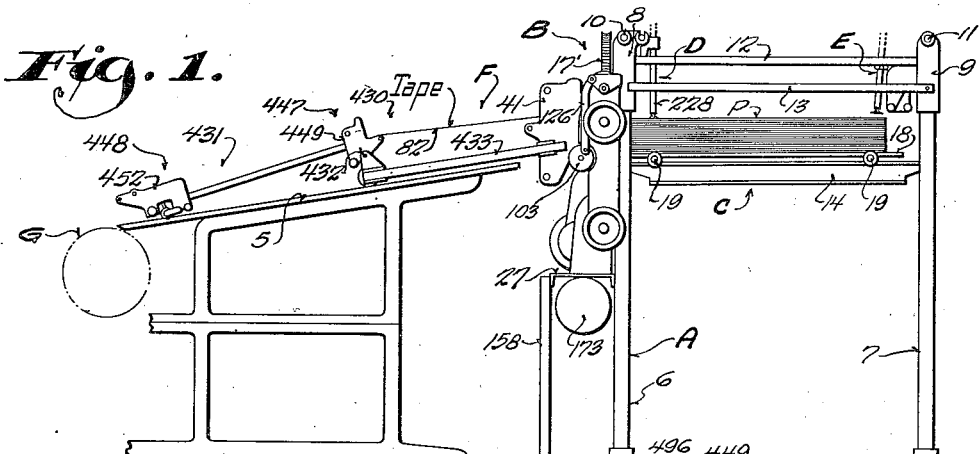
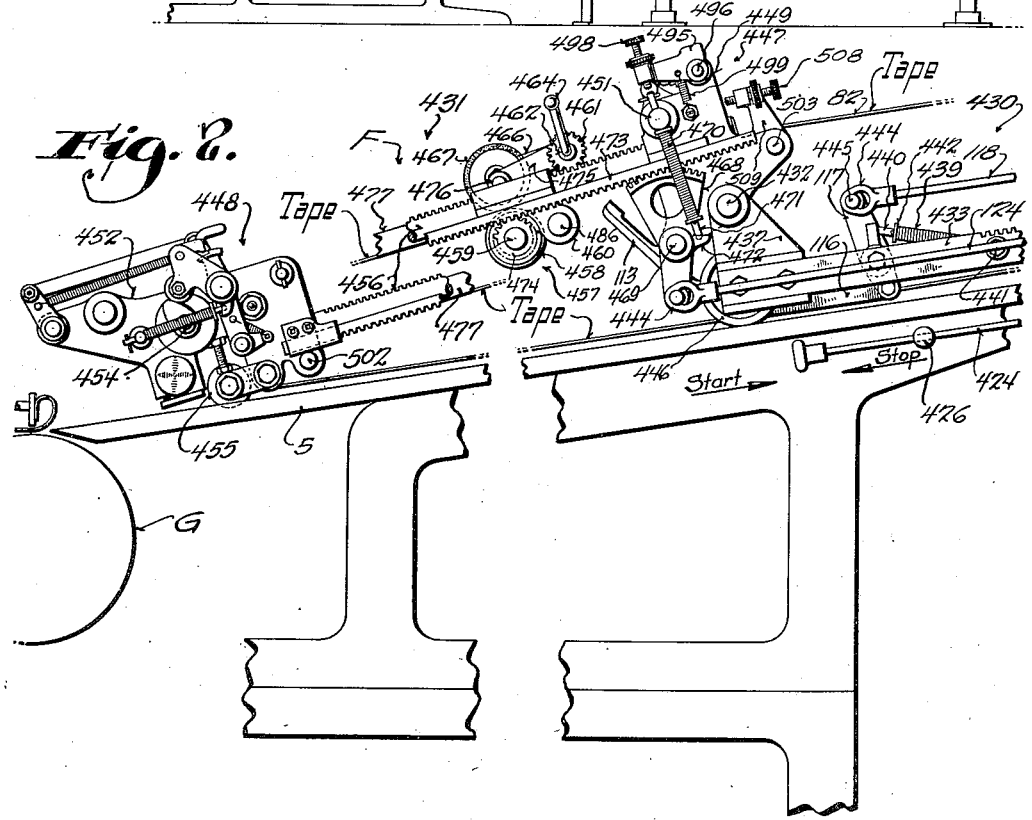
Inventors
Elmer W. Belluche
Frank R. Belluche March 30, 1937. E. W. BELLUCHE ET AL 2,075,016
SHEET FEEDING MACHINE
Filed Dec. 21, 1933 25 Sheets-Sheet 2

Fig. 2ª.

Inventors
Elmer W. Belluche
Frank R. Belluche

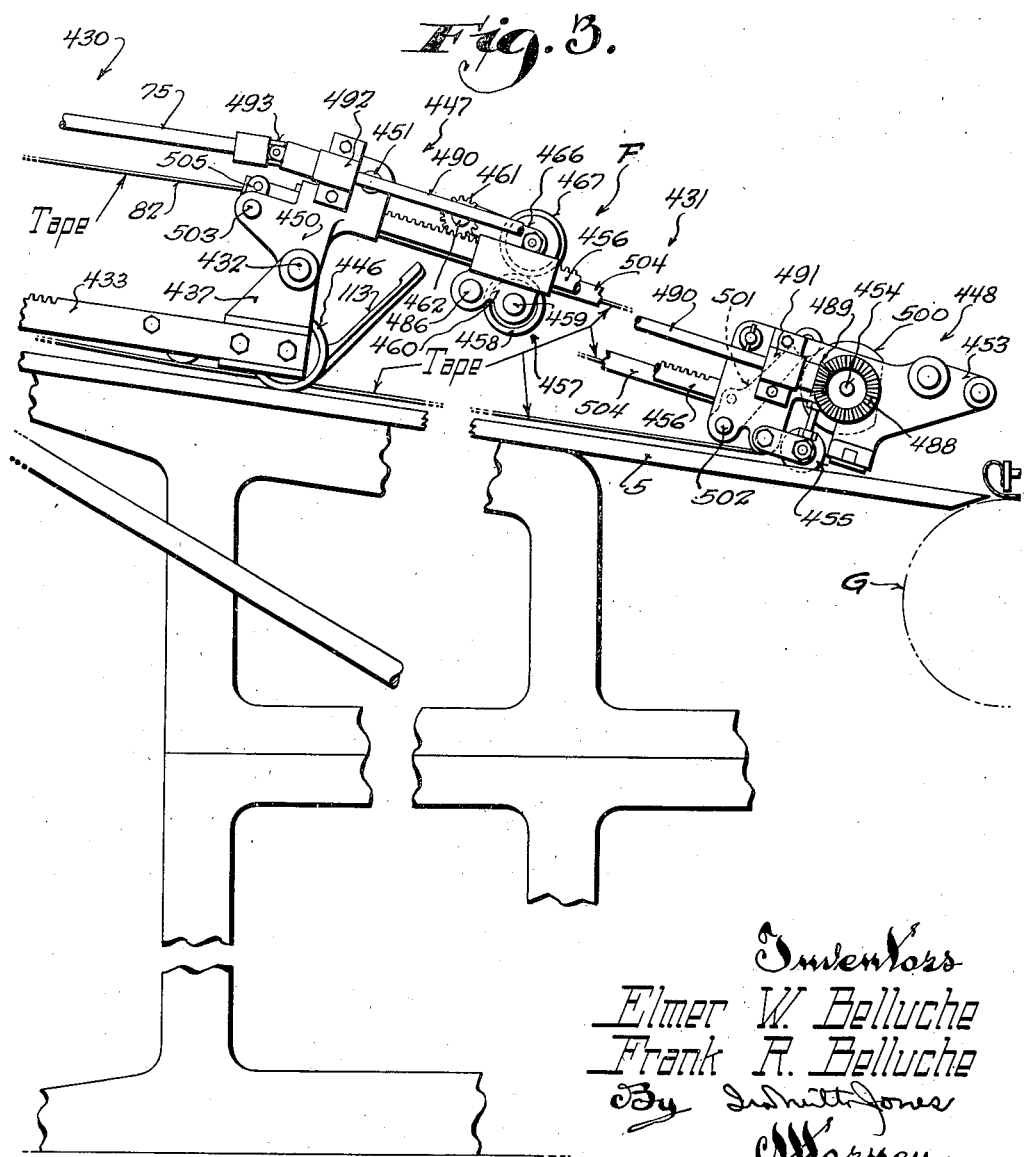

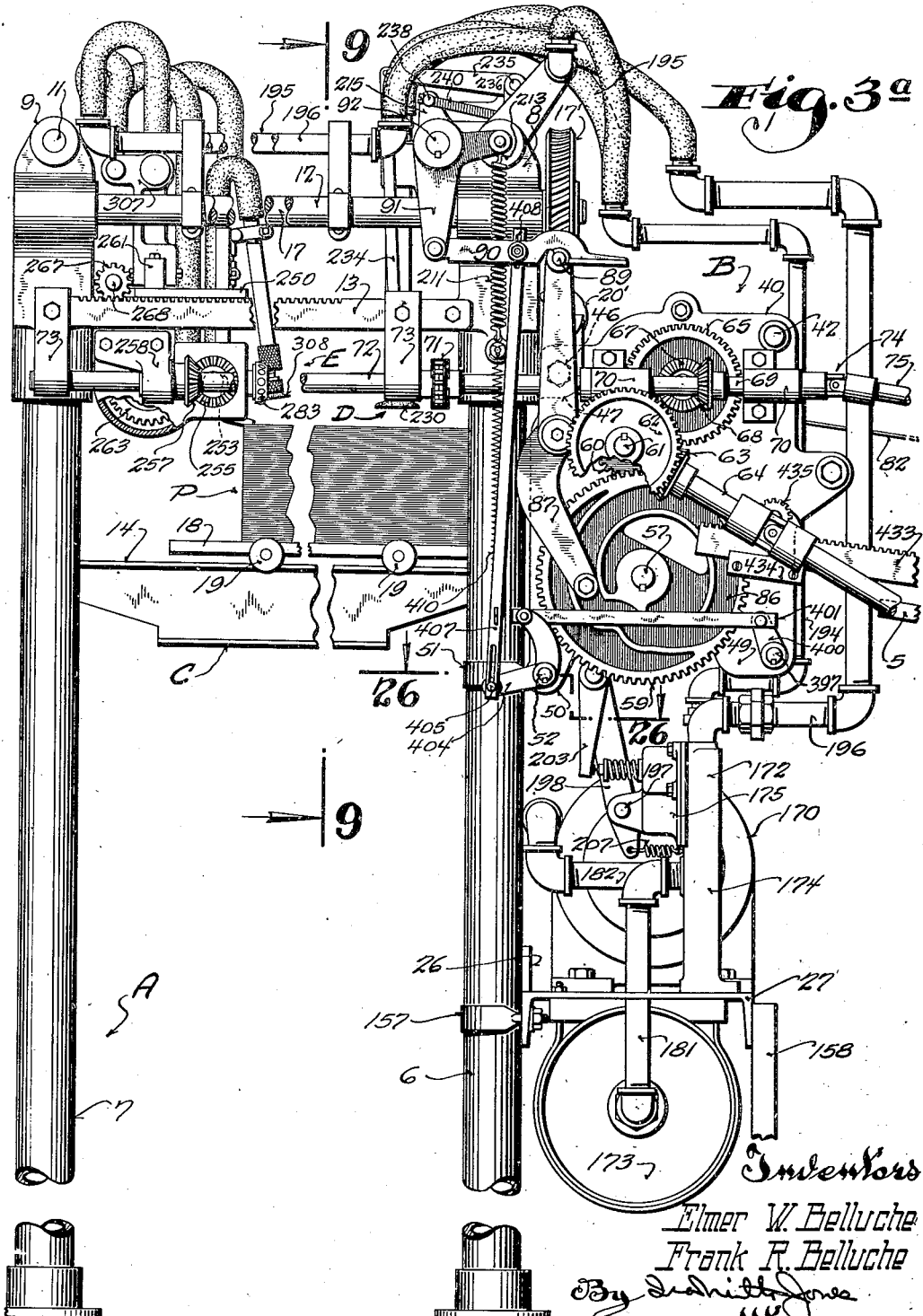

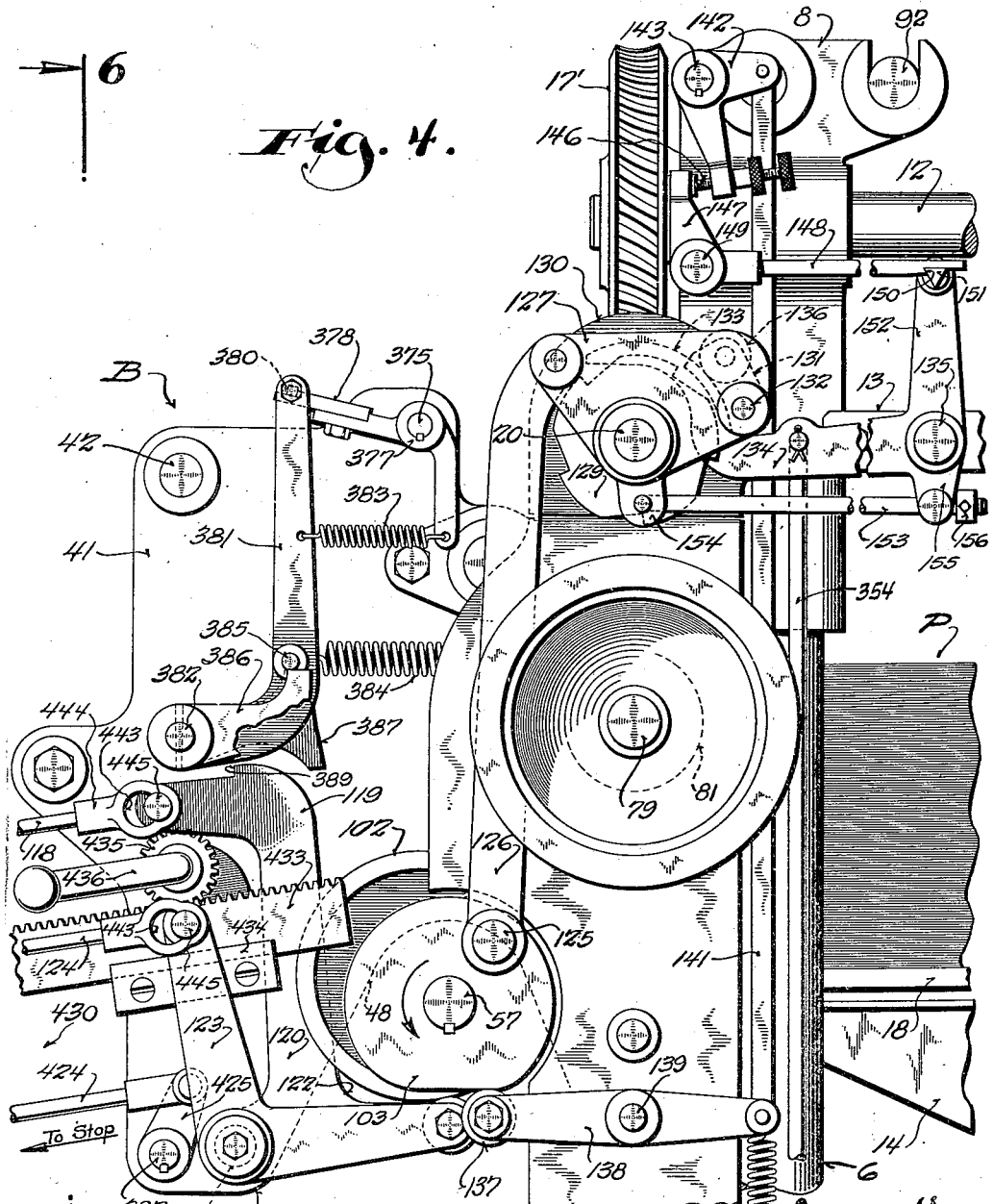

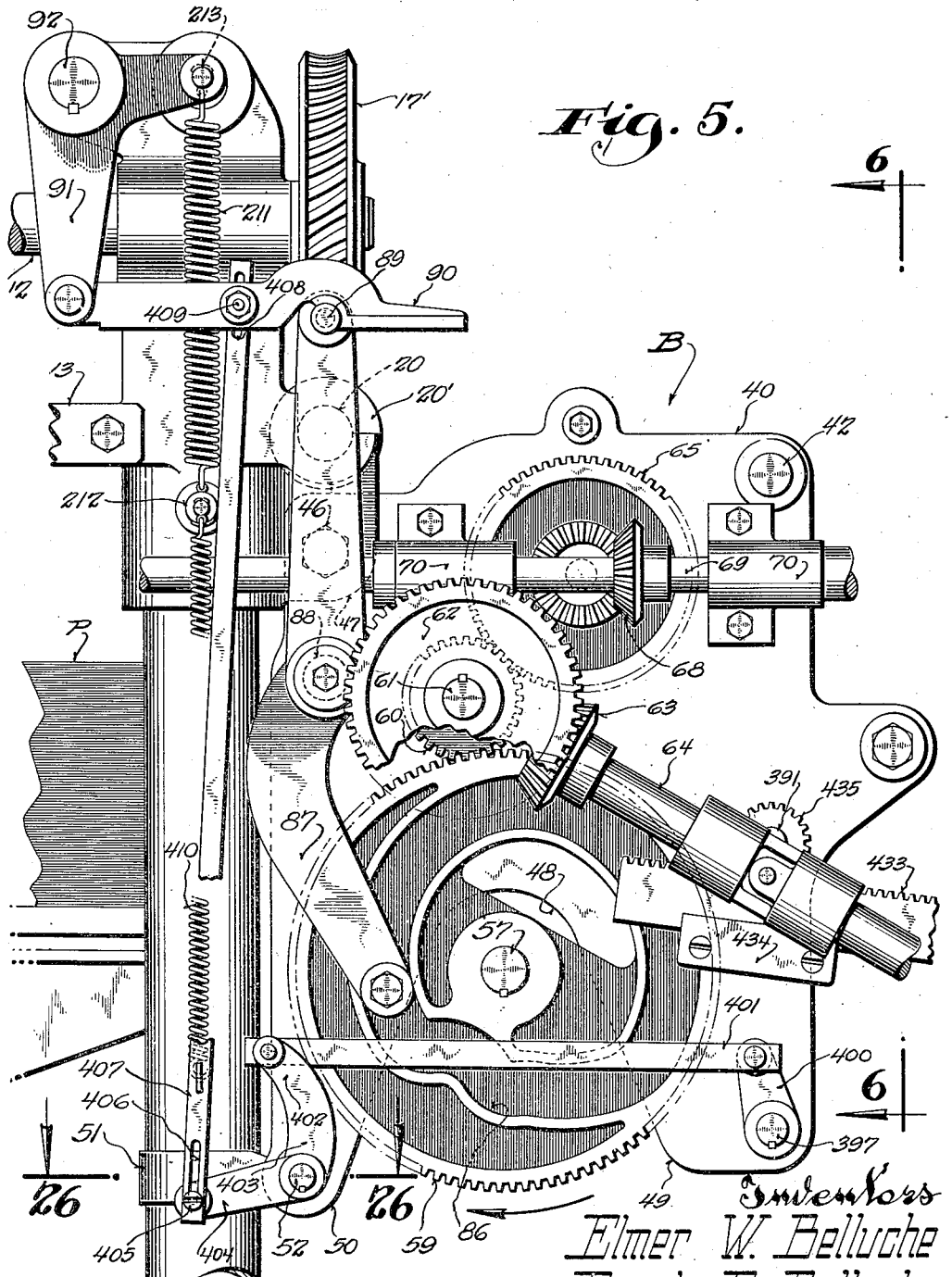

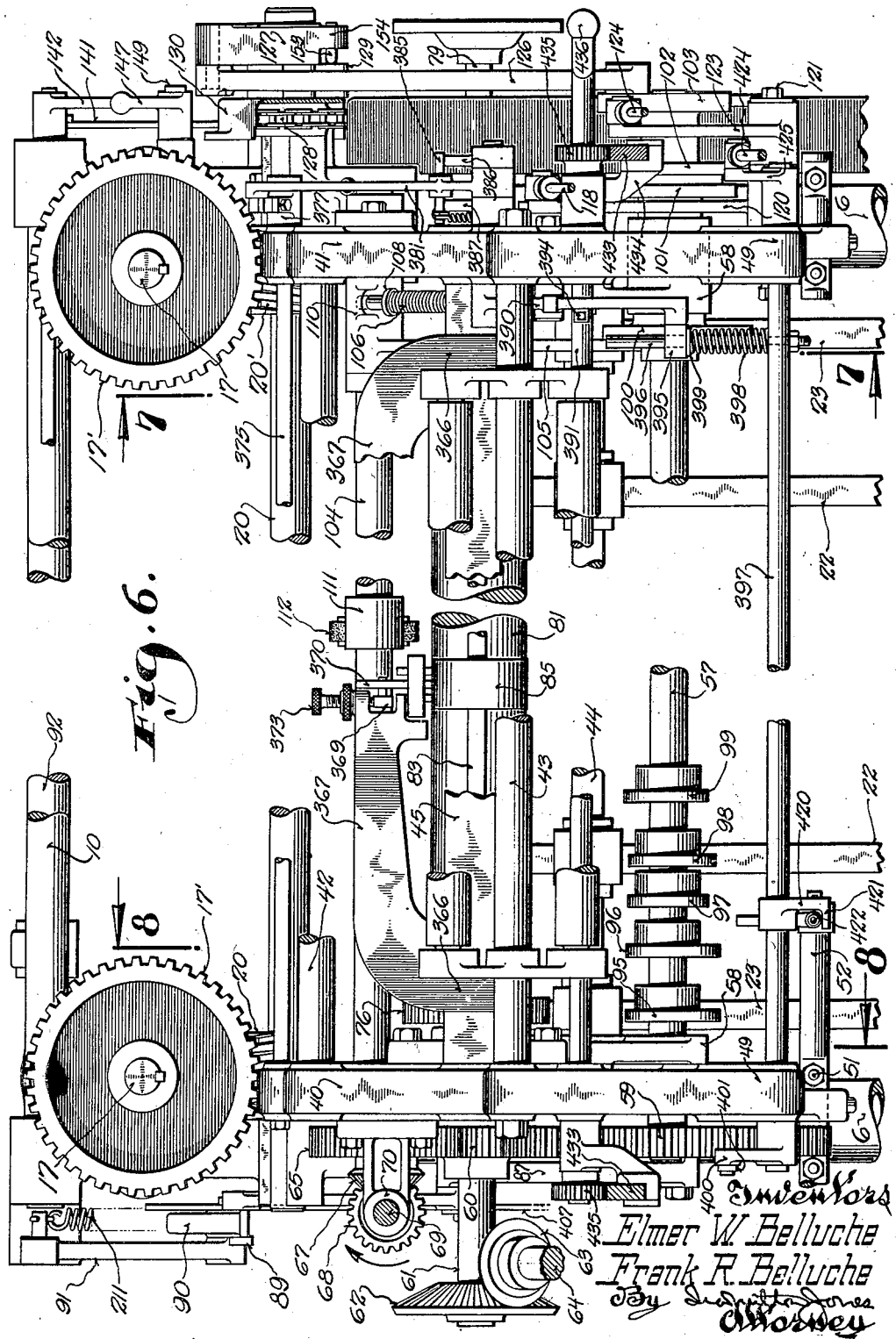

March 30, 1937.  E. W. BELLUCHE ET AL  2,075,016
SHEET FEEDING MACHINE
Filed Dec. 21, 1933   25 Sheets-Sheet 8
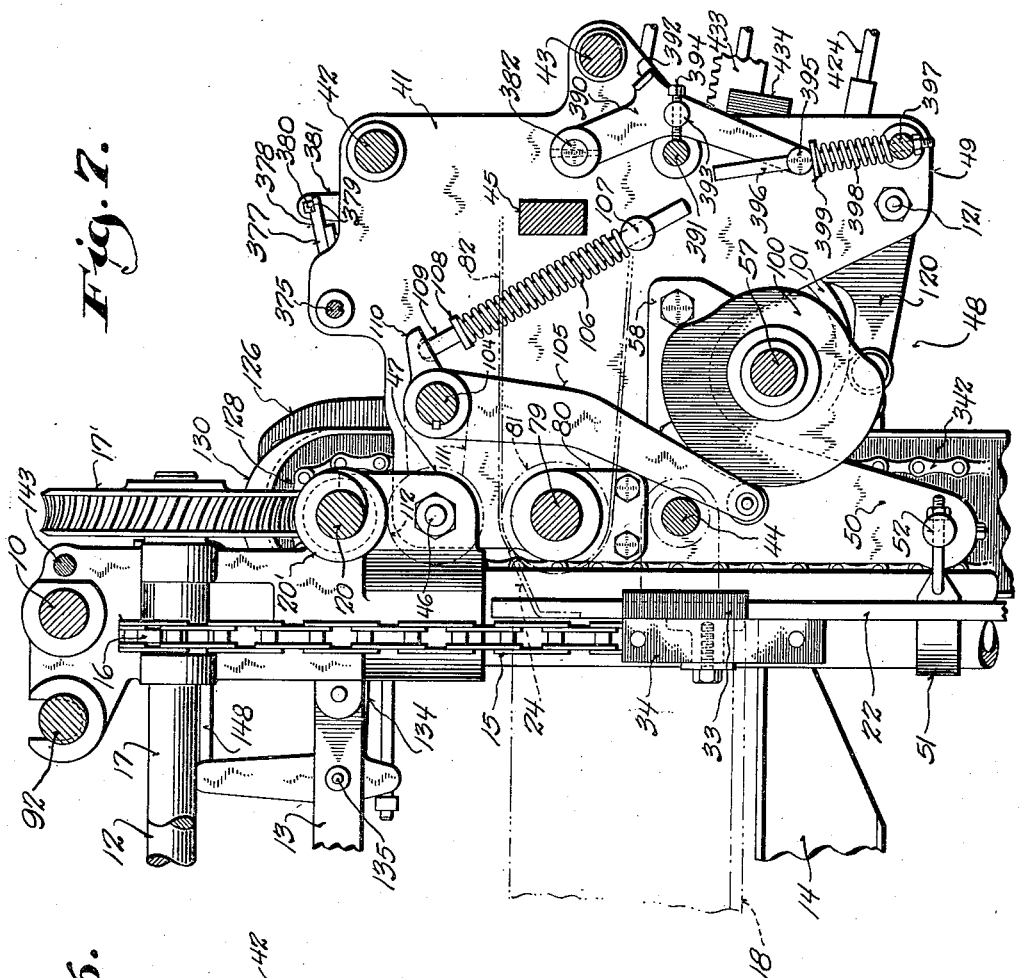
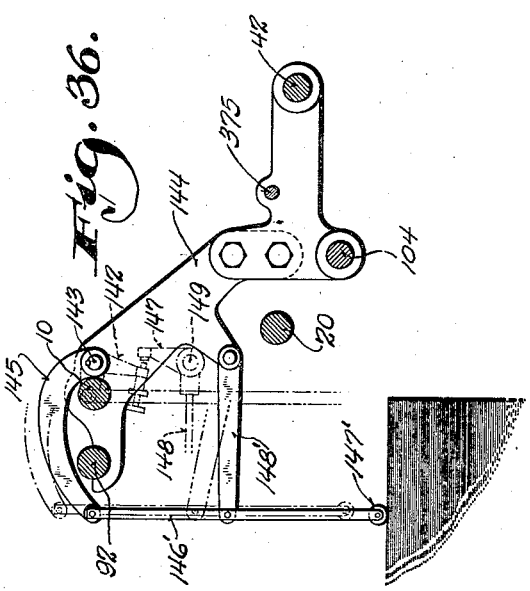
Inventors
Elmer W. Belluche
Frank R. Belluche

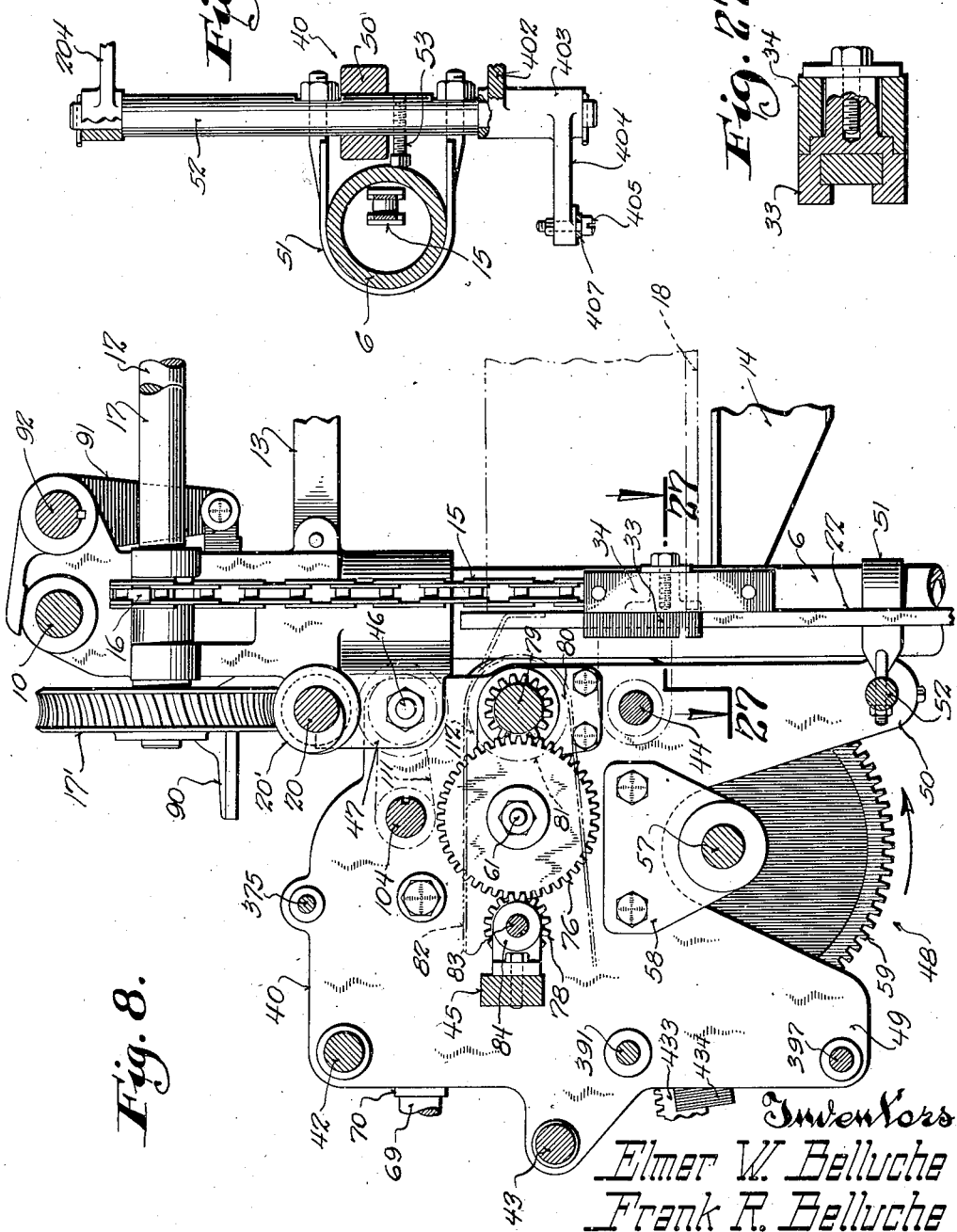

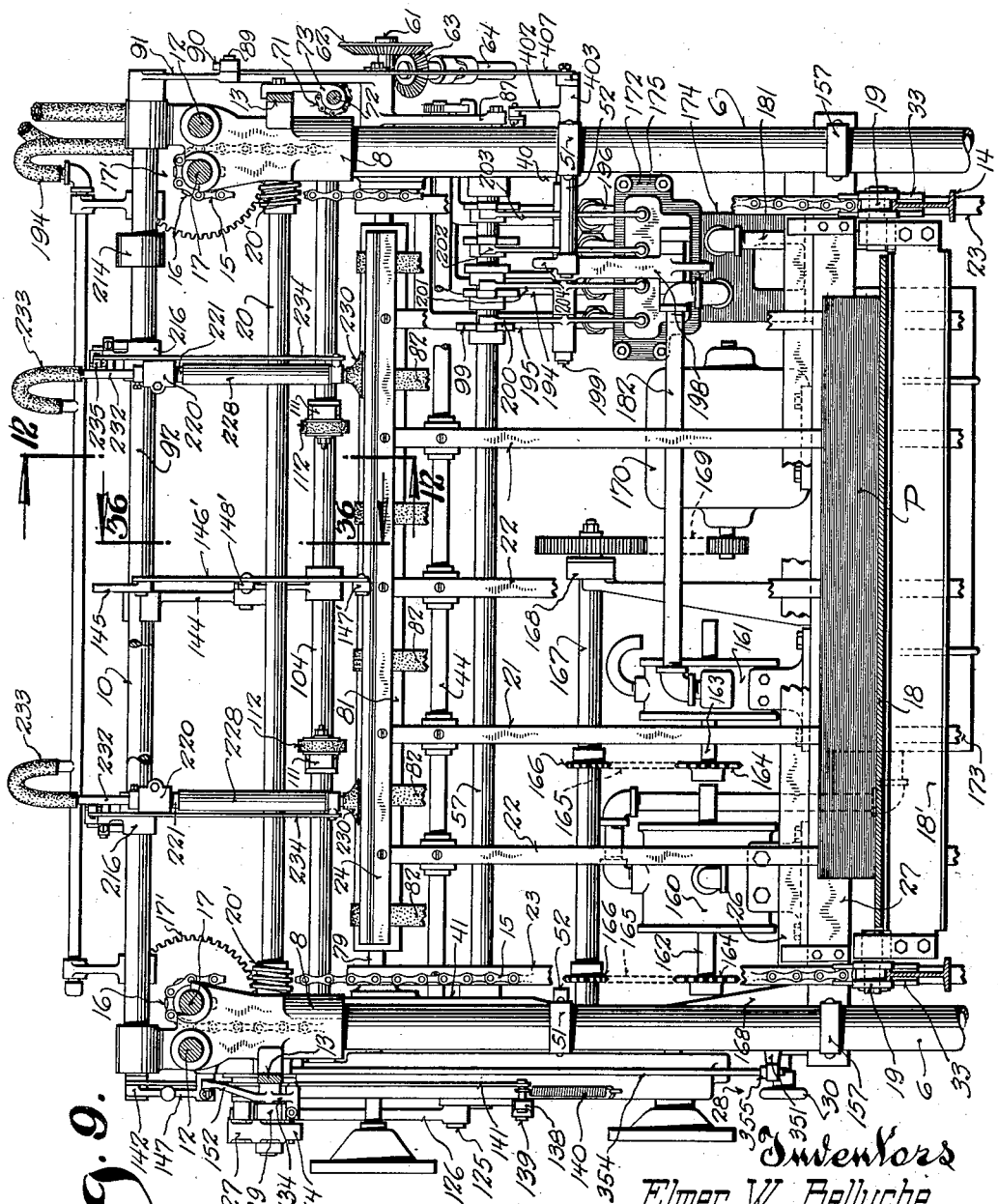

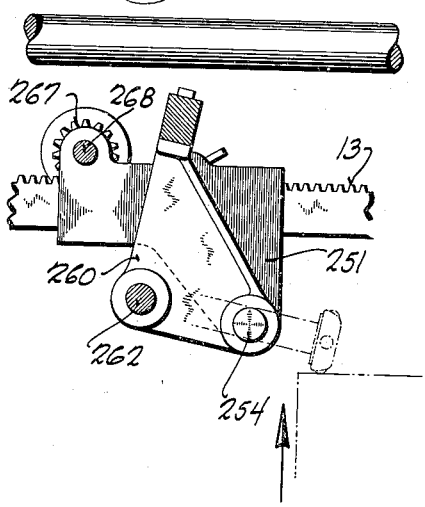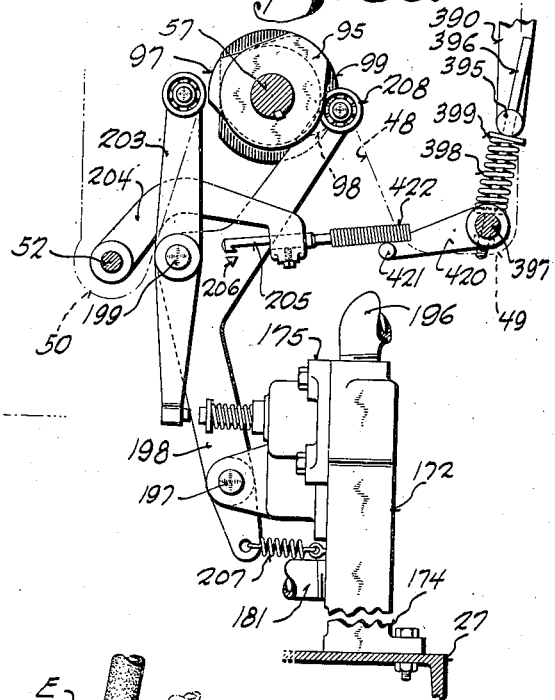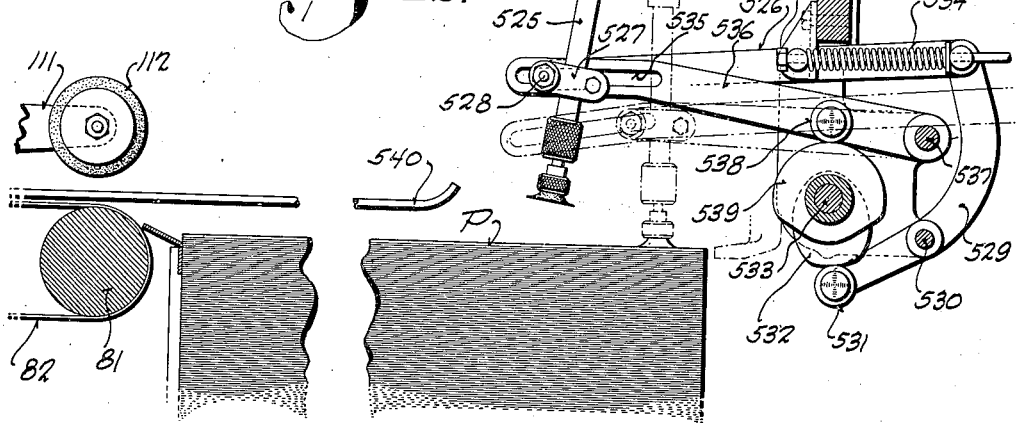

March 30, 1937.  E. W. BELLUCHE ET AL  2,075,016
SHEET FEEDING MACHINE
Filed Dec. 21, 1933  25 Sheets-Sheet 13

Inventors
Elmer W. Belluche
Frank R. Belluche
By [signature]
Attorney

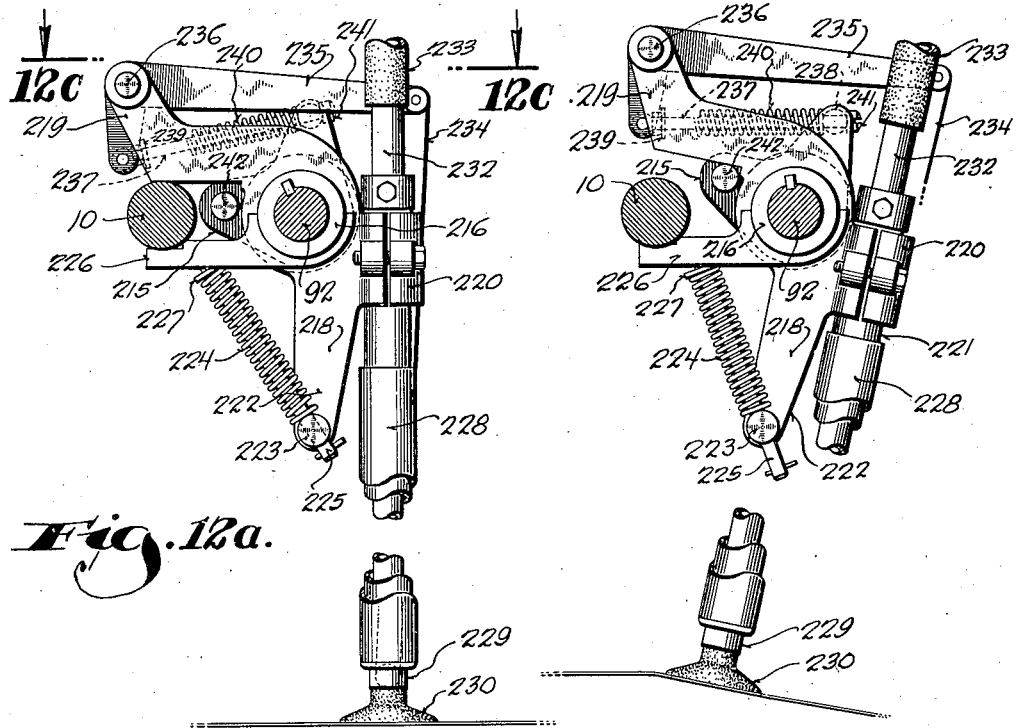
Fig. 12a.
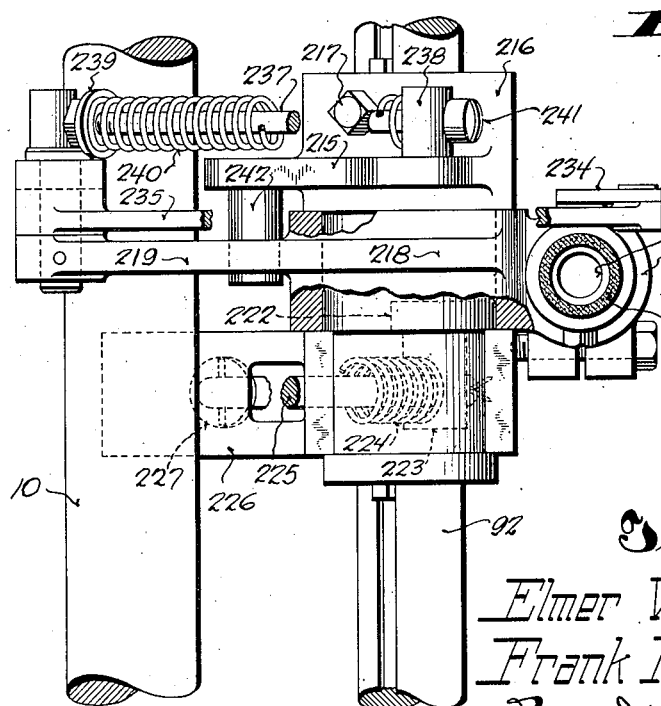
Fig. 12b.
Fig. 12c.
Inventor
Elmer W. Belluche
Frank R. Belluche March 30, 1937.  E. W. BELLUCHE ET AL  2,075,016
SHEET FEEDING MACHINE
Filed Dec. 21, 1933  25 Sheets-Sheet 15

Inventors
Elmer W. Belluche
Frank R. Belluche
By Ludwitt Jones
Attorney

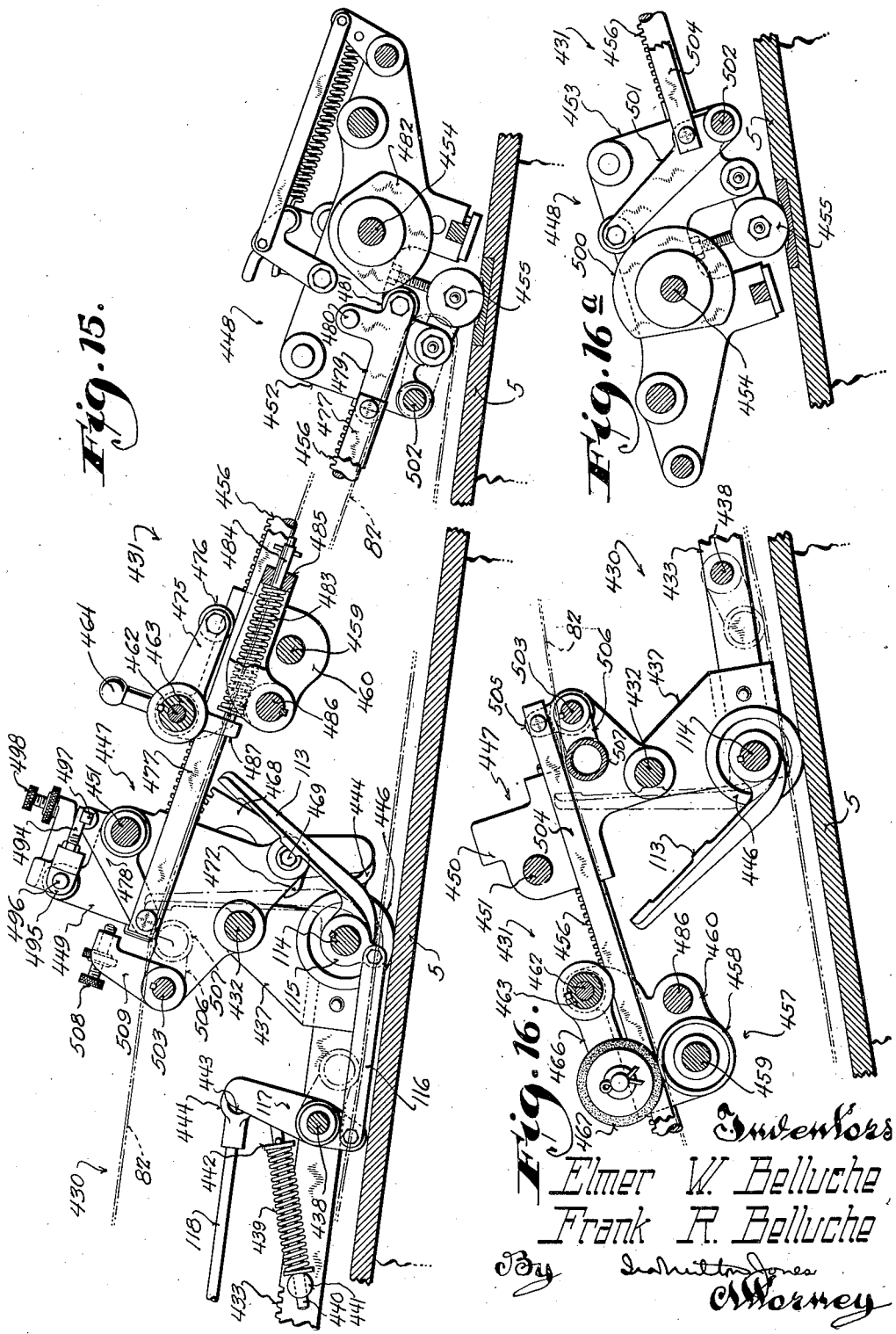

March 30, 1937.　　E. W. BELLUCHE ET AL　　2,075,016
SHEET FEEDING MACHINE
Filed Dec. 21, 1933.　　25 Sheets-Sheet 17

Inventors
Elmer W. Belluche
Frank R. Belluche
By
Attorney

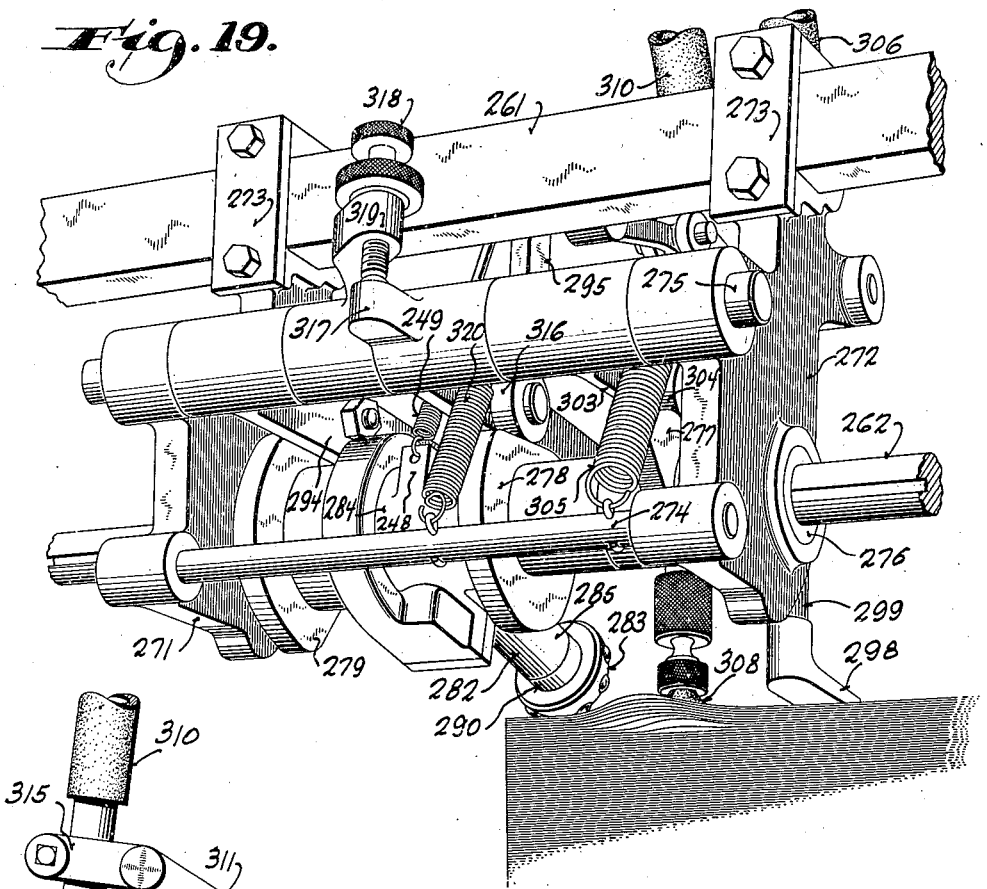
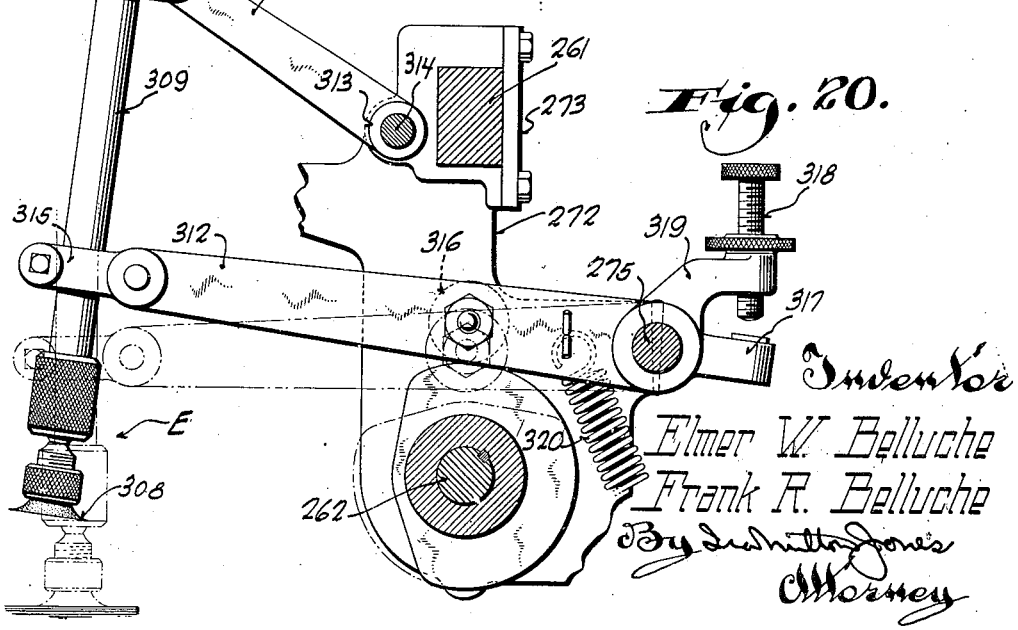

Inventors
Elmer W. Belluche
Frank R. Belluche

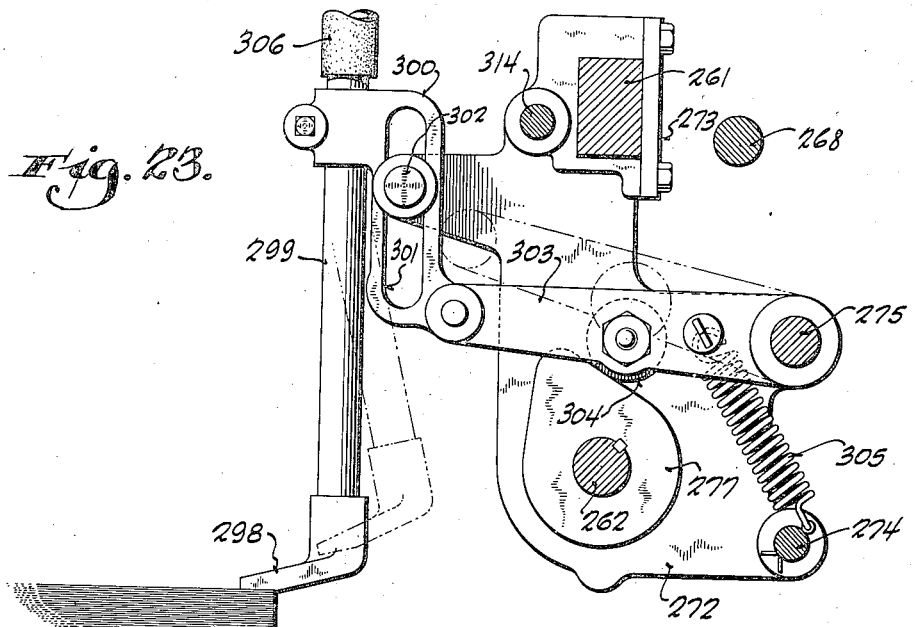
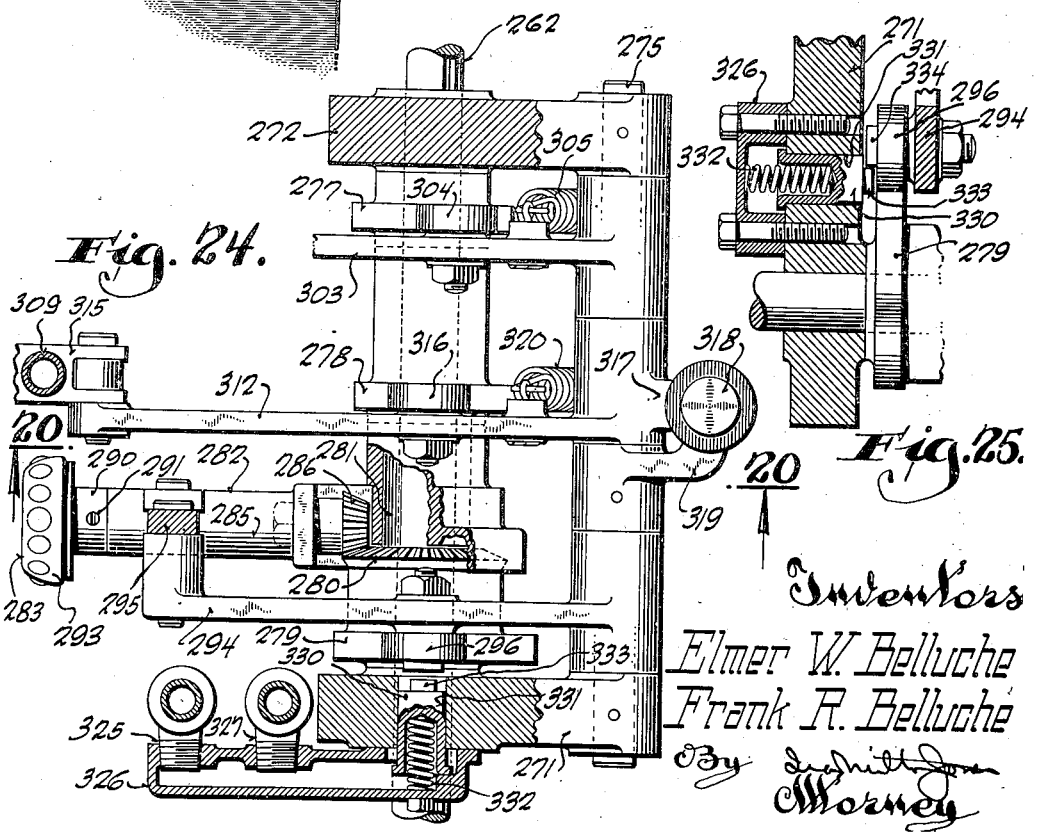

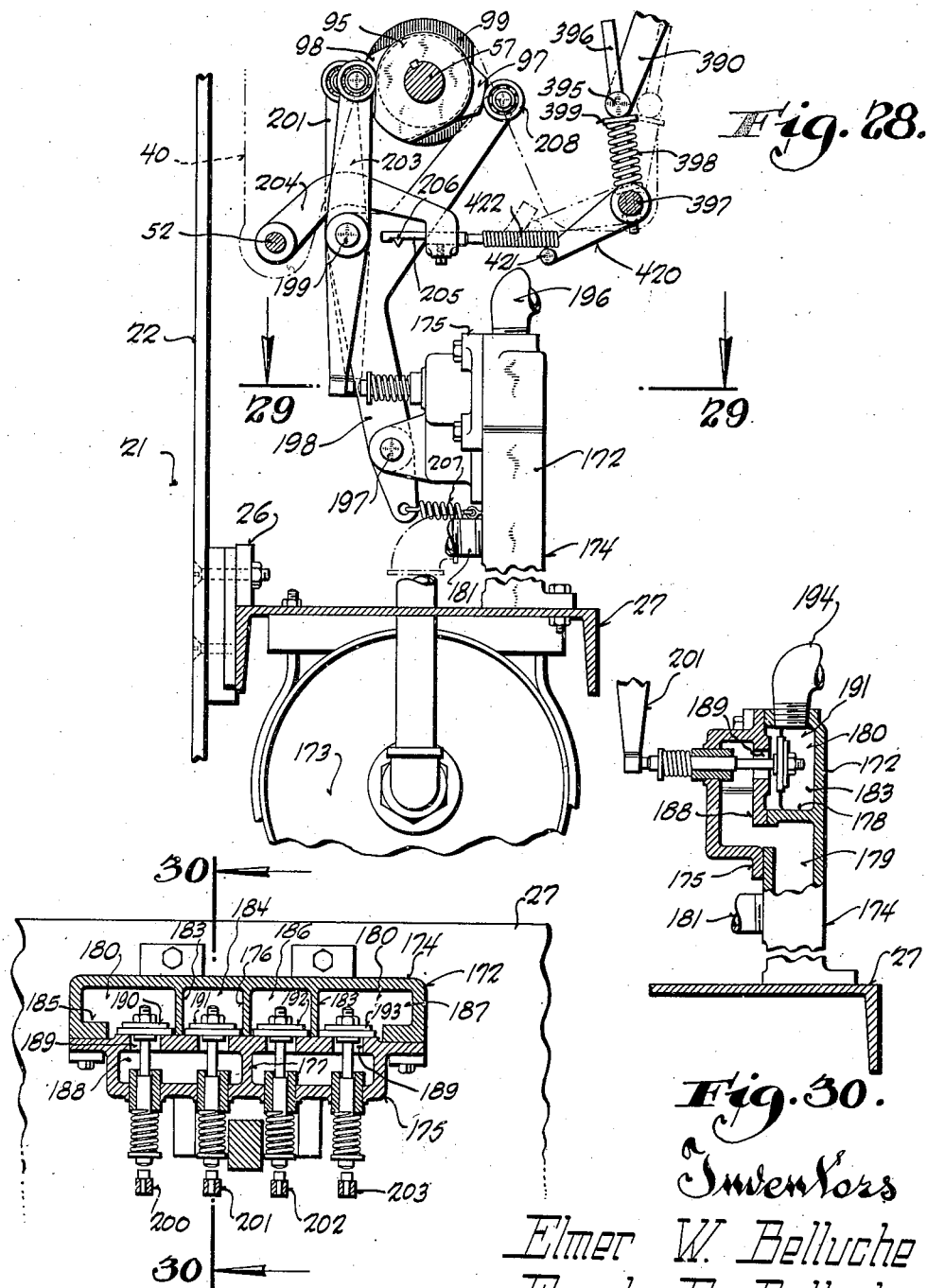

March 30, 1937.  E. W. BELLUCHE ET AL  2,075,016
SHEET FEEDING MACHINE
Filed Dec. 21, 1933  25 Sheets-Sheet 22
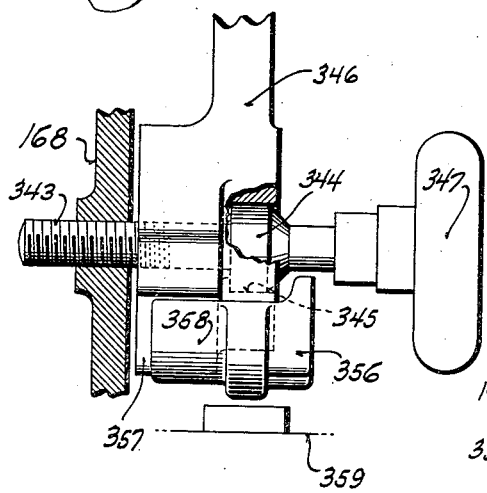
Fig. 33.
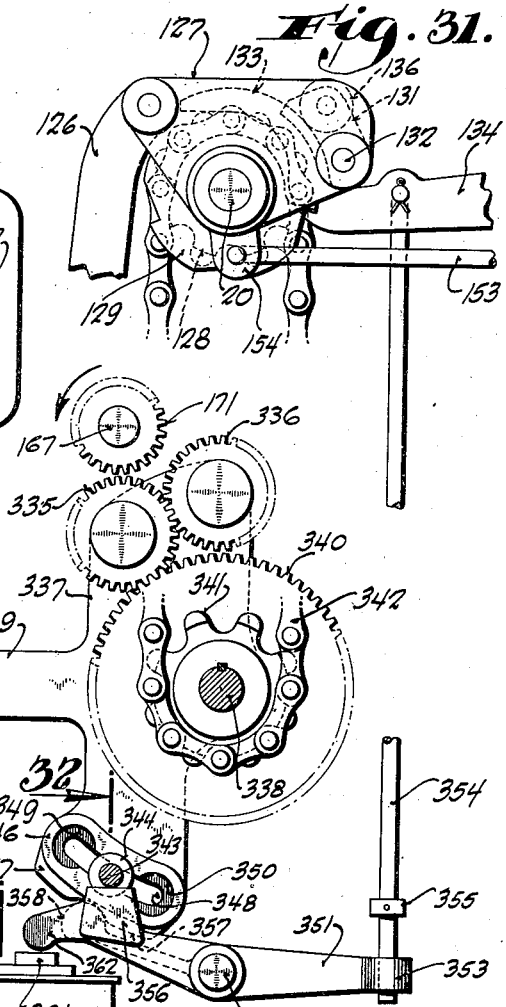
Fig. 31.
Fig. 32.
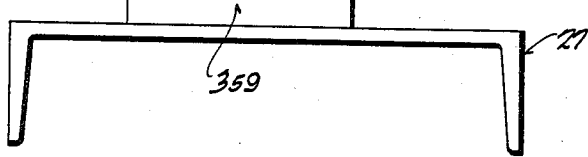
Inventors
Elmer W. Belluche
Frank R. Belluche
By Isabella Jones
Attorney

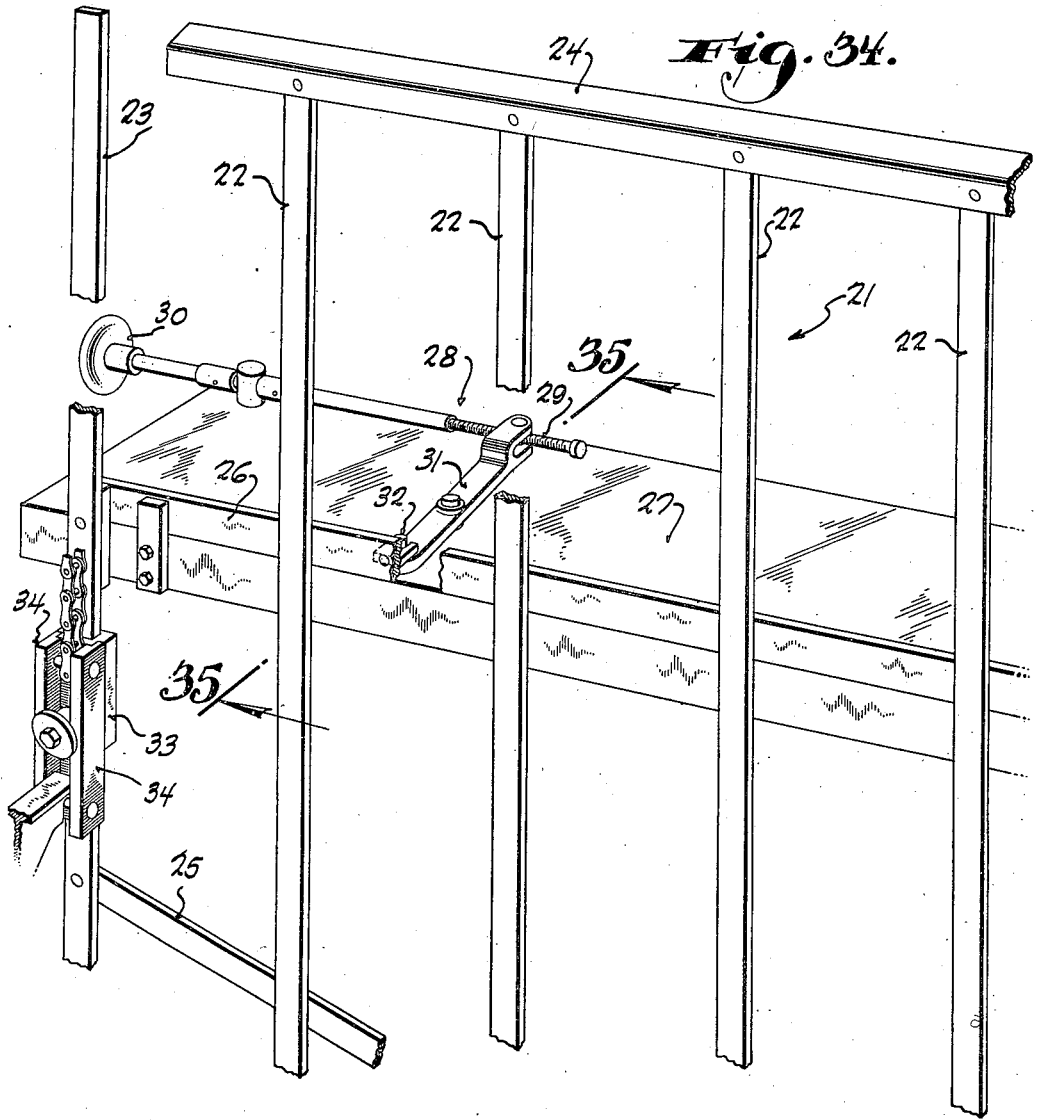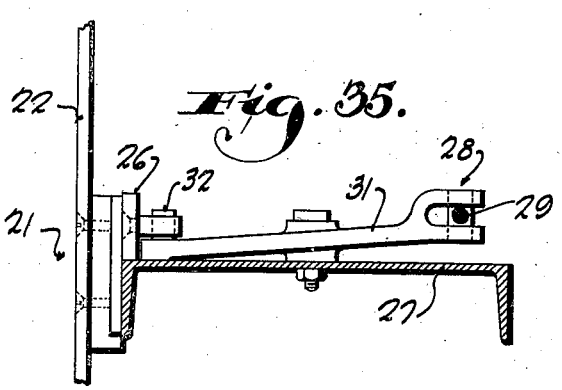

March 30, 1937.  E. W. BELLUCHE ET AL  2,075,016
SHEET FEEDING MACHINE
Filed Dec. 21, 1933   25 Sheets-Sheet 24

Inventors
Elmer W. Belluche
Frank R. Belluche
By
Attorney

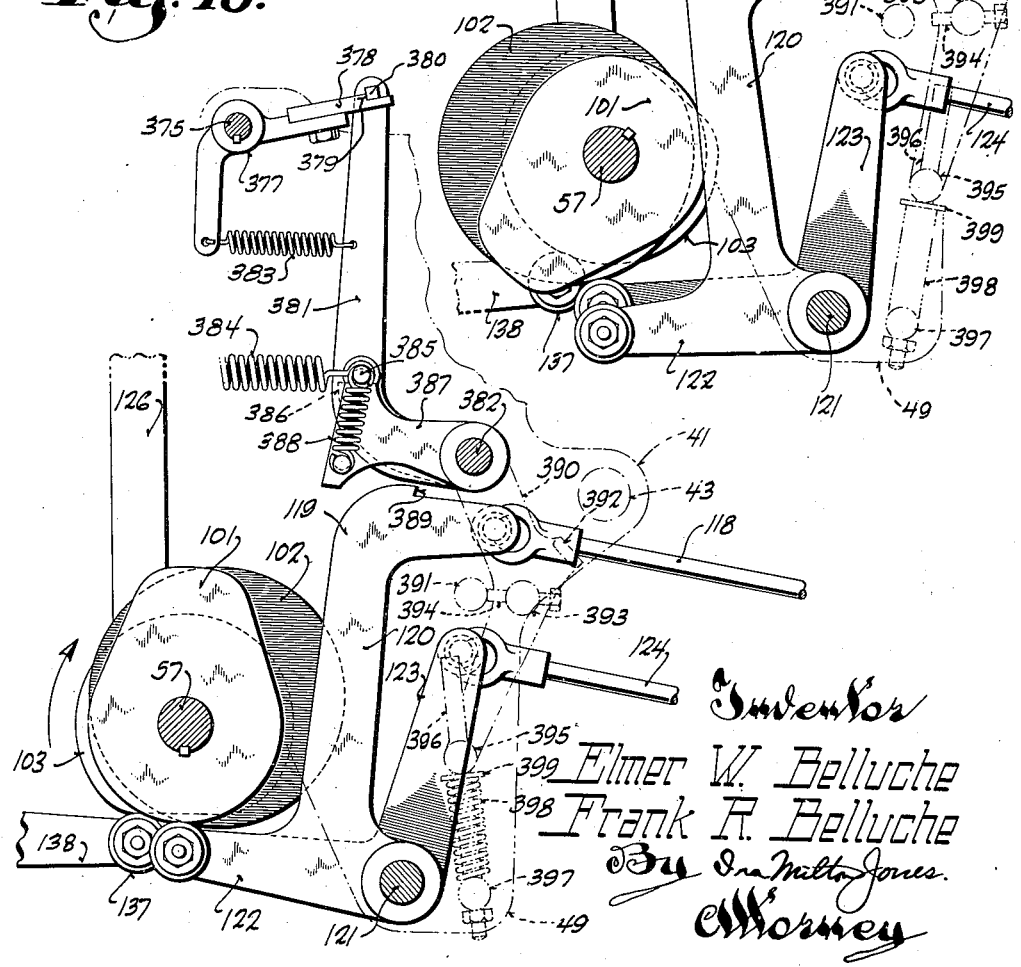

Patented Mar. 30, 1937

2,075,016

UNITED STATES PATENT OFFICE 2,075,016

SHEET FEEDING MACHINE

Elmer W. Belluche and Frank R. Belluche, Racine, Wis., assignors to Christensen Machine Company, Racine, Wis., a corporation of Wisconsin Application December 21, 1933, Serial No. 703,370

60 Claims. (Cl. 271—28)

This invention relates to improvements in sheet feeders for high speed printing presses and kindred machinery and refers more particularly to pile feeders wherein the sheets are picked off the top of a pile and are fed into the printing press or other machine with which the feeder is connected.

It is a general object of this invention to effect an all around improvement in feeders of this type and to particularly afford greater accuracy and a higher possible speed of operation.

More specifically, it is an object of this invention to provide a novel manner of starting and stopping the feeding action by which it is possible to instantaneously stop the entire feeding action either automatically by the functioning of tripping mechanism initiated by the calipers or sheet detector, or manually when desired, and to instantly resume the feeding action merely by the actuation of a single manually operable handle. Heretofore, the means for starting and stopping the feeding action of the feeder has entailed the engagement and disengagement of a clutch or clutches, and the picking up of comparatively heavy loads during starting. This requirement was objectionable and is entirely overcome in the present invention.

Another object of this invention resides in the provision of means operable automatically to stop the entire feeding action and also arrest the forward motion of an imperfect sheet, or a double sheet, which, by its passage through the calipers has initiated the action of the tripping mechanism. In this connection, it is a further object of this invention to utilize the sheet straighteners to arrest the forward travel of the imperfect or double sheet. This arrangement materially simplifies the construction of the sheet arresting means, for in feeders heretofore in use, if means were provided at all for stopping an imperfect or double sheet, such means was independent of the sheet straighteners and required an entirely separate train of mechanism to effect its operation.

Another object of this invention resides in the provision of novel suction means for forwarding the sheets from the pile onto the delivery roll. Heretofore, where suction means have been employed to pick off the topmost sheet and convey it onto the delivery mechanism, it has been customary to mount the suction means so that it had a definite straight line horizontal motion. This design required comparatively complicated mechanism, so that in comparison, the present invention attains the desired action in a very simple and expeditious manner. In place of moving the forwarding suction means in a planar horizontal movement, it has a swinging motion about a single mounting shaft.

Another object of this invention is to provide suction means which are automatically lifted by the effect of vacuum upon the sealing of their contact cups while the feeding action is in progress, and are mechanically lifted when the suction is turned off to preclude dragging the cups across the top of the pile.

It is also an object of this invention to utilize the forwarding suction means to clamp down on the pile whenever the feeding action is stopped.

In this connection, it is a further object to provide sheet forwarding mechanism in which the rear suckers which pick up the sheet also function to advance the same, thus eliminating the usual front suckers.

Another object of this invention resides in the provision of an improved combing wheel construction. Heretofore, it has been the general practice to construct combing wheels with a series of fiber rollers loosely mounted between two carrier plates rotatably mounted. These rollers wore out rapidly and were otherwise deficient, and to overcome these objections, this invention utilizes a conventional ball bearing assembly as the combing wheel.

Another object of this invention is to provide simple means for holding the combing wheel out of contact with the pile when the feeding action is stopped. Heretofore, no means have been provided for preventing the engagement of the combing wheel with the pile during cessation of the forwarding action unless the entire driving mechanism were stopped. In this invention, the combing wheels are effectively held out of contact with the pile by pneumatically operated means functioning as an incident to the shutting off of the suction during the stopping of the feeding action.

Another object of this invention is to provide novel means for adjusting the distance the rear suction means descends toward the pile to enable the same to be accurately adjusted to the buckle produced in the topmost sheets by the combing wheels. Heretofore it has been necessary to shut down the entire feeder when adjustment of the rear suckers was to be made. In the present invention the adjustment of the rear suckers may be effected without interrupting the operation of the feeder and merely by turning a conveniently located adjusting screw.

Another object of this invention is to provide means for positively coordinating the action of the sheet straightener with the functioning of the slow down rolls and the means for forwarding the sheets into the delivery mechanism. Heretofore, the functioning of the slow down rolls has been in response to mechanism driven through a comparatively long chain of driving connections and motion transmitting elements coming from a driving source entirely different from that which operates the sheet straighteners and sheet feeding mechanism. Consequently, it has been difficult to obtain the proper coordination between these elements. To overcome this difficulty, the present invention provides means actuated by, and entirely dependent upon the functioning of the sheet straightener for determining the exact time at which the slow down rolls function.

In this connection, it is a further object of this invention to drive the driven slow down roll, and actuate the sheet straighteners and the drop rolls which coact with the main delivery roll to start the sheet forward through the delivery mechanism, all from a common cam shaft to positively insure accurately timed coordination between these elements.

Another object of this invention is to provide novel means for rapidly elevating or depressing the pile and automatic means for insuring the presence of the operator directly at the pile so as to preclude the possibility of raising or lowering the pile too far without the use of complicated and not entirely reliable safety devices. Heretofore, the provision of an independent drive for the pile elevator, operable to raise and lower the pile under manual control, has been a more or less complicated mechanism and has required the disconnection of several driving connections or the complete shutting down of the feeder drive. Also in past constructions, special safety devices had to be provided to preclude excessive elevation or depression of the pile.

These deficiencies and objections of past feeder constructions are overcome in the present invention by the provision of a readily operable gear shifting arrangement and means responsive to the actuation of the control member therefor, for requiring manual depression of the electric starting button as long as elevation or depression of the pile is to continue.

In this connection, it is a further object of this invention to mount the rear suckers and associated mechanism for pivotal movement about a horizontal axis so that in the event the pile is inadvertently elevated beyond the desired height, damage to this mechanism will be precluded by reason of the fact that it is free to rise with the pile.

A further object of this invention is to so construct the feeder as to facilitate its erection. Heretofore, it has always been a difficult task to erect a feeder of the character described particularly where it is designed to handle comparatively large sheets. In the absence of hoisting equipment which in the average printing shop is not available, the erection of the feeder has entailed manual lifting of heavy mechanisms into comparatively high positions and the difficult securement of such mechanisms to their supporting structure, while so held.

To overcome this objection the present invention contemplates the construction of the supporting structure and the main mechanism head which is the heaviest portion of the device to be elevated, so that part of the pile elevator may be employed to raise the mechanism head to its proper position, and to hold the same while it is secured in place.

With the above and other objects in view which will appear as the description proceeds, our invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, we have illustrated two complete examples of the physical embodiment of our invention constructed according to the best modes we have so far devised for the practical application of the principles thereof, and in which:

Figure 1 is a diagrammatic side view illustrating the general arrangement of the feeder;

Figure 2 is an enlarged side view showing part of the delivery mechanism from the feed side thereof;

Figure 2a is a continuation of Figure 2 and showing the feed side of the feeder proper;

Figure 3 is a view similar to Figure 2, but showing the opposite or gear side of the delivery mechanism;

Figure 3a is a continuation of Figure 3 showing the gear side of the feeder proper;

Figure 4 is an enlarged view in elevation of the feed side of the mechanism head;

Figure 5 is an enlarged view of the opposite or gear side of the mechanism head;

Figure 6 is a transverse section view taken through the feeder on the plane of the lines 6—6 of Figures 4 and 5;

Figure 7 is a section view taken through Figure 6 on the plane of the line 7—7;

Figure 8 is a section view taken through Figure 6 on the plane of the line 8—8;

Figure 9 is a section view through the feeder taken on the plane of the line 9—9 of Figure 3a;

Figure 11 is a detail section view taken through Figure 10 on the plane of the line 11—11;

Figures 12a and 12b are views similar to Figure 12, showing the elements thereof in other positions;

Figure 12c is a top view of the structure shown in Figure 12 with parts thereof broken away and in section;

Figure 15 is an enlarged section view of the delivery mechanism, said view showing the inside of the feed side of the mechanism;

Figures 16 and 16a are views similar to Figure 15, showing the inside of the gear side of the delivery mechanism;

Figure 19 is a perspective view of the same rear sucker and its associated mechanism shown in Figure 17, but viewed from the rear;

Figure 20 is a detail section view showing one of the rear suckers, said view being taken on the plane of the line 20—20 of Figure 24;

Figure 23 is a detail section view taken through Figure 10 on the plane of the line 23—23 to show the combined air discharge nozzle and pressure foot, and the means for imparting motion thereto;

Figure 24 is a top section view taken through Figure 21 on the plane of the line 24—24;

Figure 25 is a detail section view taken through Figure 21 on the plane of the line 25—25;

Figure 26 is a detail section view taken through Figure 3a on the plane of the line 26—26;

Figure 27 is a detail section view through Figure 8 on the plane of the line 27—27;

Figure 28 is a detail section view showing the valve actuating cams and their mounting structure;

Figure 29 is a detail section view through the valve housing taken on the plane of the line 29—29 of Figure 28;

Figure 30 is a detail section view through Figure 29 on the plane of the line 30—30;

Figure 31 is a detail view showing the power drive means for the pile raising and lowering mechanism;

Figure 32 is a detail view partly in section taken on the plane of the line 32—32 of Figure 31;

Figure 33 is a view similar to Figure 32, but illustrating the elements thereof in another position;

Figure 34 is a detail perspective view showing the barrier against which the pile rests and illustrating the manner of adjusting the pile sidewise;

Figure 35 is a detail section view taken on the plane of the line 35—35 of Figure 34;

Figure 36 is a detail section view taken through Figure 9 on the plane of the line 36—36 and showing the pile feeler;

Figure 39 is a view similar to Figure 28 to show the valve actuating means in its inoperative position;

Figure 40 is a detail section view looking at the inside of the cams and actuating levers mounted on the feed side of the mechanism head;

Figure 41 is a view similar to Figure 40, but showing the elements thereof in tripped position; and Figure 42 illustrates a modified manner of feeding the sheets into the delivery mechanism.

Figure 10:
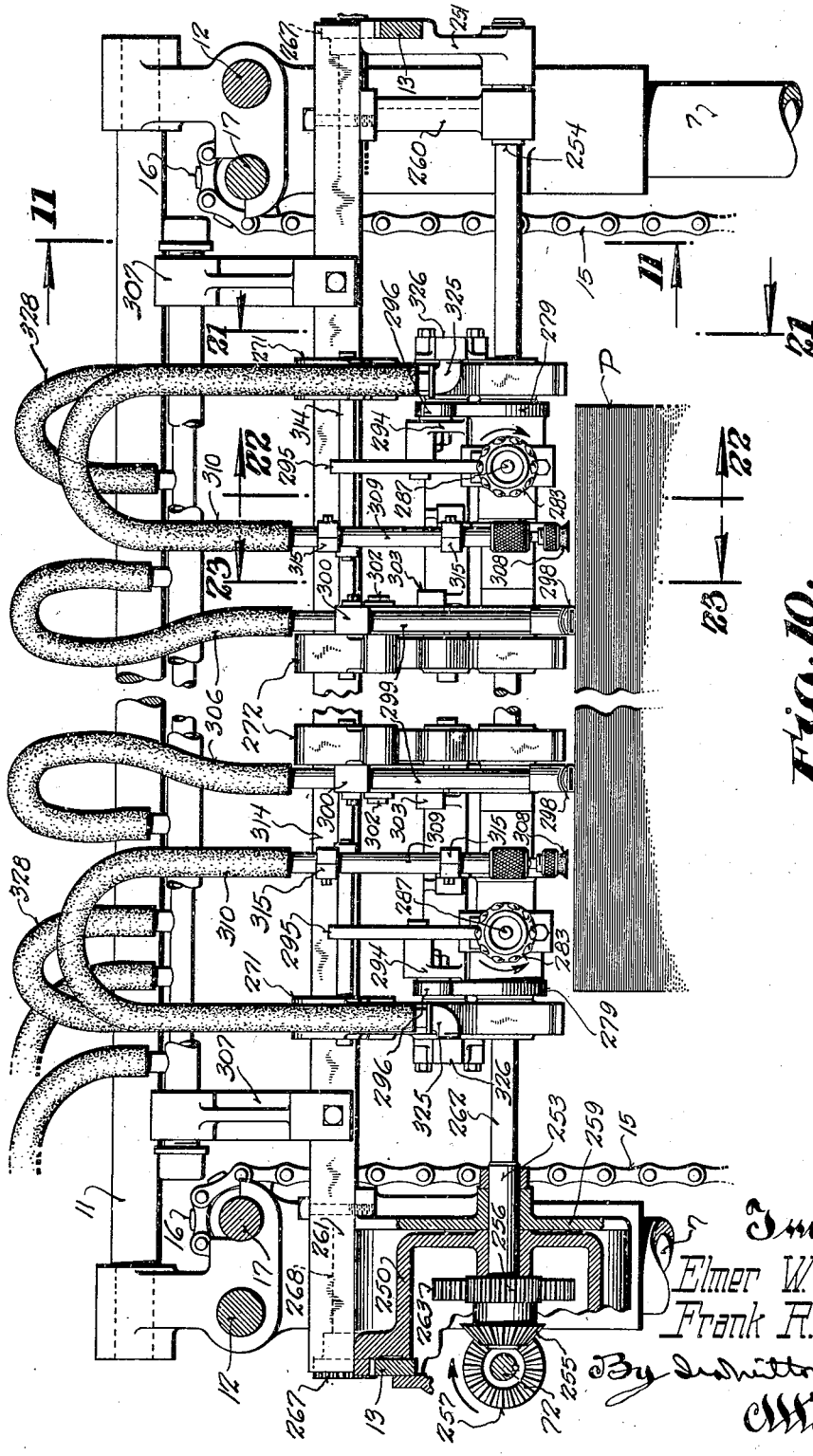
Figure 10 is a section view taken through Figure 2a on the plane of the line 10—10.

Referring now more particularly to the accompanying drawings in which like numerals indicate like parts throughout the several views, it will be seen that the general arrangement of the feeder comprises a supporting frame "A", a mechanism head "B" mounted on the supporting frame, an elevator "C" suspended from the supporting frame for the pile of sheets "P", front and rear suckers "D" and "E" respectively, to pick off the topmost sheet, and a delivery mechanism "F" to receive the sheet as it is forwarded by the front suckers, and convey it to a printing press, folder, or other machine with which the feeder is connected and which, in the present instance, is represented by a receiving cylinder "G".

As is customary, the delivery mechanism "F" rests on the feed board 5 of the press and the supporting frame "A" with the mechanism carried thereby is positioned in back of the feed board so that when desired, unobstructed access may be had to the feed board of the press by rolling back and folding up the delivery mechanism.

SUPPORTING FRAME (Figures 1, 2a, 3a, and 9. Sheets 1, 2, 3 and 10)

The general support for the feeder consists of four upright posts or columns, two front columns 6 and two rear columns 7. The bases of these columns rest on the floor and are preferably secured thereto, and the tops carry caps 8 on the front columns and 9 on the rear columns. The two front columns are connected at their tops by a tie rod 10 anchored at its opposite ends to the front caps 8 and the rear posts are connected across their tops by a tie rod 11 having its opposite ends anchored in the caps 9.

The front and rear posts are rigidly connected by longitudinal tie rods 12, whose ends are anchored in the front and rear column caps. The transverse and longitudinal tie rods thus form a rigid frame connecting the upper ends of the columns.

The front and rear column caps are further rigidly connected by rack bars 13 whose opposite ends are fixed thereto.

PILE SUPPORT AND ASSOCIATED MECHANISM (Figures 1, 2a, 3a, 4, 6, 7, 8, 9, 10, 34 and 35. Sheets Nos. 1, 2, 3, 5, 7, 8, 9, 10, 11 and 22)

The pile elevating and supporting means consists of two longitudinal rails 14 supported by chains 15 trained over sprockets 16 fixed to longitudinal shafts 17, which are journalled in open topped bearings in the front and rear column caps. One end of each chain is attached to one end of one of the rails 14 and the opposite ends of the chains hang down into the inside of the hollow columns.

Supported on the rails 14, which are inclined forwardly, is a platform 18 upon which the pile of sheets rests. The platform 18 has transverse supporting beams 18' provided with rollers 19 to track on the rails 14 and thus support the platform for forward and backward movement.

The forward ends of the shafts 17 have worm wheels 17' secured thereto and meshing with the worm wheels are right and left handed worms 20' carried by a shaft 20 which extends transversely across the tops of the front columns, being journalled in open topped bearings formed as part of the front column caps 8. Obviously, the engagement of the worm wheels with the worms precludes rotation of the shafts 17 by the weight of the pile, and rotation of the worm shaft 20 provides means for adjusting the elevation of the pile.

The worm shaft 20 is adapted to be driven rapidly by manually controlled means to effect rapid elevation or depression of the pile, and is also arranged to be automatically actuated during the operation of the feeder to gradually raise the elevation of the pile as the sheets are removed therefrom. The manner in which the shaft 20 is actuated will be hereinafter defined.

In view of the inclination of the supporting rails 14, the platform and the pile supported thereon automatically moves forwardly to maintain the front face of the pile against a barrier 21. The barrier 21 as best illustrated in Figure 34, consists of a plurality of intermediate vertical bars 22 between two endmost vertical bars 23. The upper ends of the intermediate bars are all attached to a cross piece 24 which forms a support for the sheets as they are forwarded from the pile into the delivery mechanism.

The endmost bars 23 are rigidly connected at their lower portions by diagonal cross braces 25, and near their upper portions by a transverse bar 26. At their extreme bottoms, the endmost bars are transversely slidably mounted on a suitable transverse support (not shown) carried by the front columns. The cross bar 26 connecting the upper portions of the endmost vertical bars 23, is slidably mounted on a shelf 27 carried by the front columns as will be hereinafter more fully described and is slidable by means of an adjusting mechanism 28 (see Figure 34) to effect sidewise adjustment of the bars 23.

The adjusting mechanism 28 comprises a screw 29 having a hand wheel 30, and a medially pivoted lever 31 carrying a nut at one end threaded on the screw 29 and having a connection 32 at its opposite end with the transverse bar 26.

The transverse adjustment of the side bars 23 is utilized to effect sidewise adjustment of the pile with respect to the delivery mechanism, and to this end, the connections between the front chains and the front ends of the rails 14 embody slides 33. These slides 33 embrace the bars 23 and are attached to side plates 34 which form parts of the connections between the ends of the chains and the rails. (See Figures 34 and 27.)

MECHANISM HEAD (*Figures 1, 2a, 3a, 4, 5, 6, 7, 8, and 9. Sheets 1, 2, 3, 5, 6, 7, 8, 9 and 10.*)

The mechanism head "B", is supported on the front columns. Its supporting structure comprises two side frames, a gear side frame 40, and a feed side frame 41 connected by transverse tie rods 42, 43, and 44, and by a rectangular cross bar 45.

This rigid framework is suspended from the front column caps by bolts 46 passing through aligned openings in flanges 47 carried by the column caps and the adjacent upper inner corner portions of the side frames. (See Figures 7 and 8.)

Each side frame has a recess 48 extending upwardly from its bottom to divide the lower portion thereof into front and rear leg portions 49 and 50 respectively. The rear leg portions 50 of the side frames lie adjacent the front columns and are clamped thereto by U straps 51.

To provide anchorage for the ends of the straps, the side frame leg portions 50 carry transverse stub shafts 52 which project from opposite sides of the side frames. Adjusting screws 53 are preferably threaded in these transverse stub shafts to bear against the adjacent portions of the columns and provide convenient means for adjusting the position of the mechanism head.

A main cam shaft 57 is supported from the side frames with its axis located in the crotch of the recesses 48, by bearings 58 fixed to the inner faces of the side frames. On its gear side end, the main cam shaft 57 has a large gear 59 fixed thereto to overlie the outer face of the adjacent side frame 40.

Meshing with the gear 59 is a pinion 60 fixed to a stub shaft 61, which extends through the side frame 40 and is journalled in a bearing carried thereby. On the extreme outer end of the stub shaft 61, a bevel gear 62 is fixed, to mesh with a bevel pinion 63 fixed to a main drive shaft 64. The main drive shaft 64 is preferably driven from the press or other machine with which the feeder is connected to insure synchronization between the feeder and the press.

Also meshing with the drive pinion 60 is a gear 65 journalled on a stub shaft 66 fixed to the side frame 40. Formed either integral with the gear 65 or fastened thereto, is a bevel pinion 67, which meshes with a pinion 68 fixed to a horizontal shaft 69. The shaft 69 extends horizontally across the outer face of the side frame 40 and is journalled in bearings 70.

The rear end of the shaft 69 is coupled as at 71 to a horizontal drive shaft 72 journalled in bearings 73 carried by the adjacent rack bar 13, to provide a drive for the rear suckers and their associated mechanism as will be hereinafter more fully described. The forward end of the shaft 69 is connected through a universal joint 74 with a downwardly inclined drive shaft 75, which extends forwardly and provides a drive for certain parts of the delivery mechanism also to be hereinafter more fully described.

Fixed to the inner end of the stub shaft 61, which is driven from the main drive shaft 64 is a gear 76, (see Figure 8), which meshes with two pinions 77 and 78, disposed at diametrically opposite sides of the gear 76. The pinion 77 is fixed to a shaft 79 journalled in bearings 80 secured to the inner faces of the side frames and on which the main delivery roll 81 is mounted.

Figure 12:
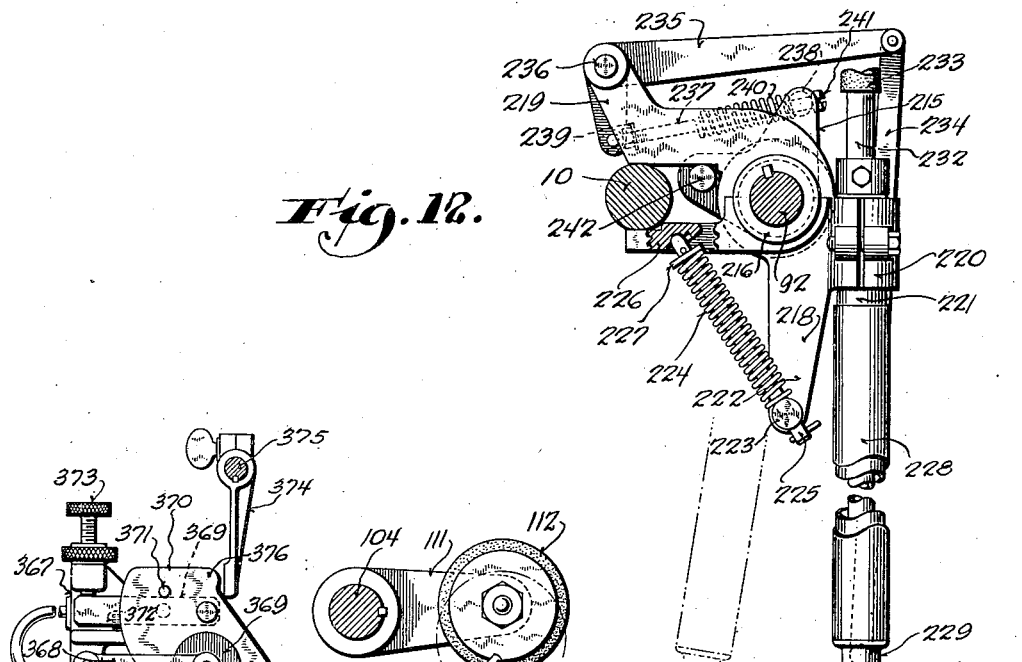
Figure 12 is a detail section view taken through Figure 9 on the plane of the line 12—12.
Figure 13:
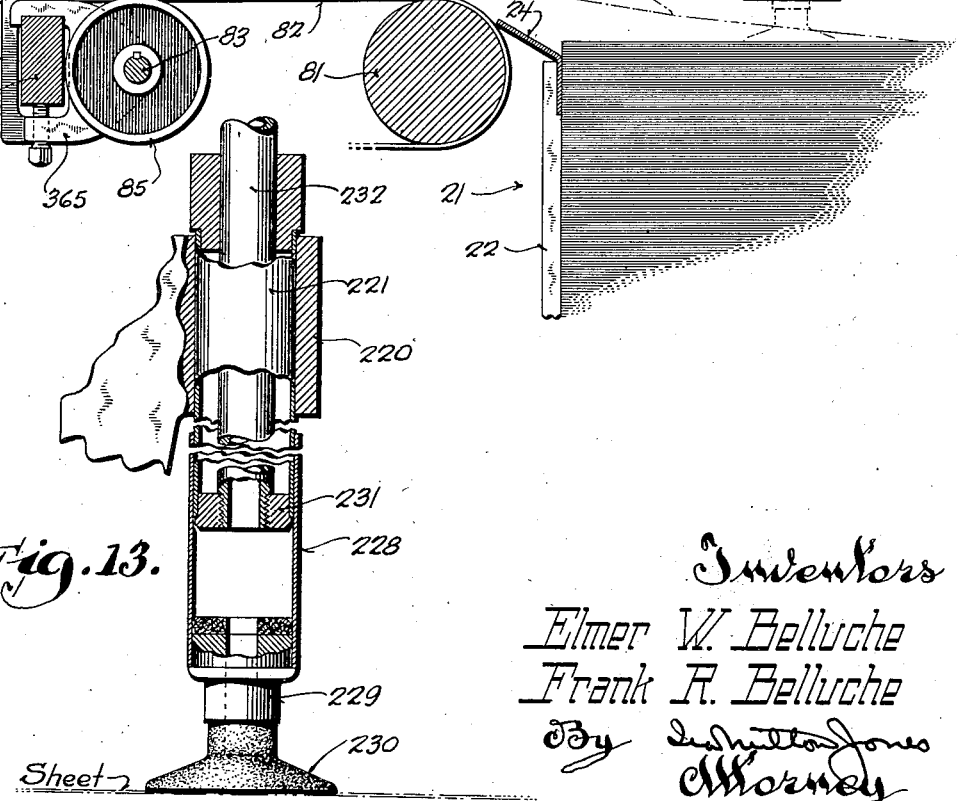
Figure 13 is a detail view showing the construction of the front suckers.
Figure 14:
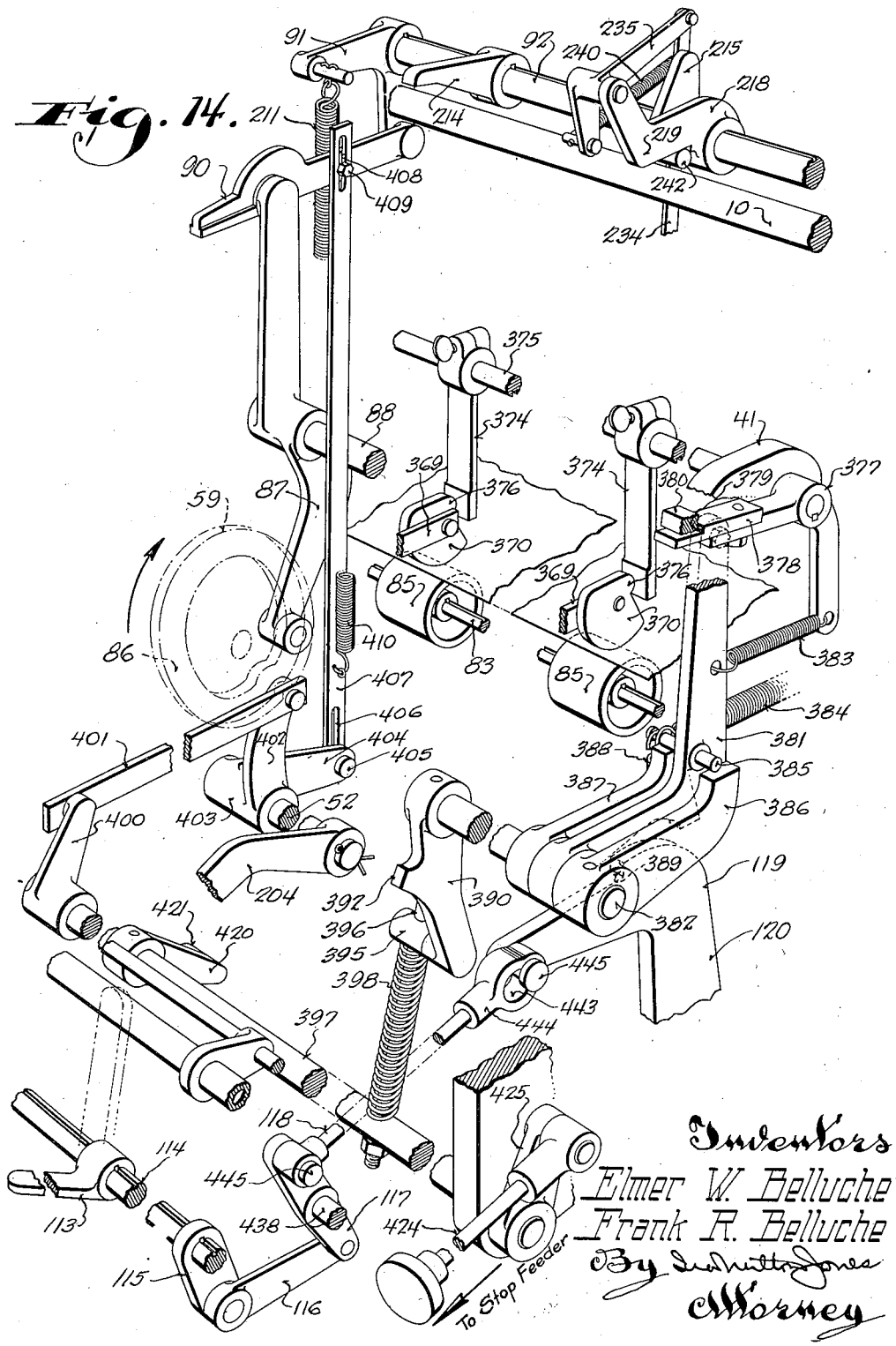
Figure 14 is a diagrammatic perspective view illustrating particularly the tripping mechanism.
Figure 17:
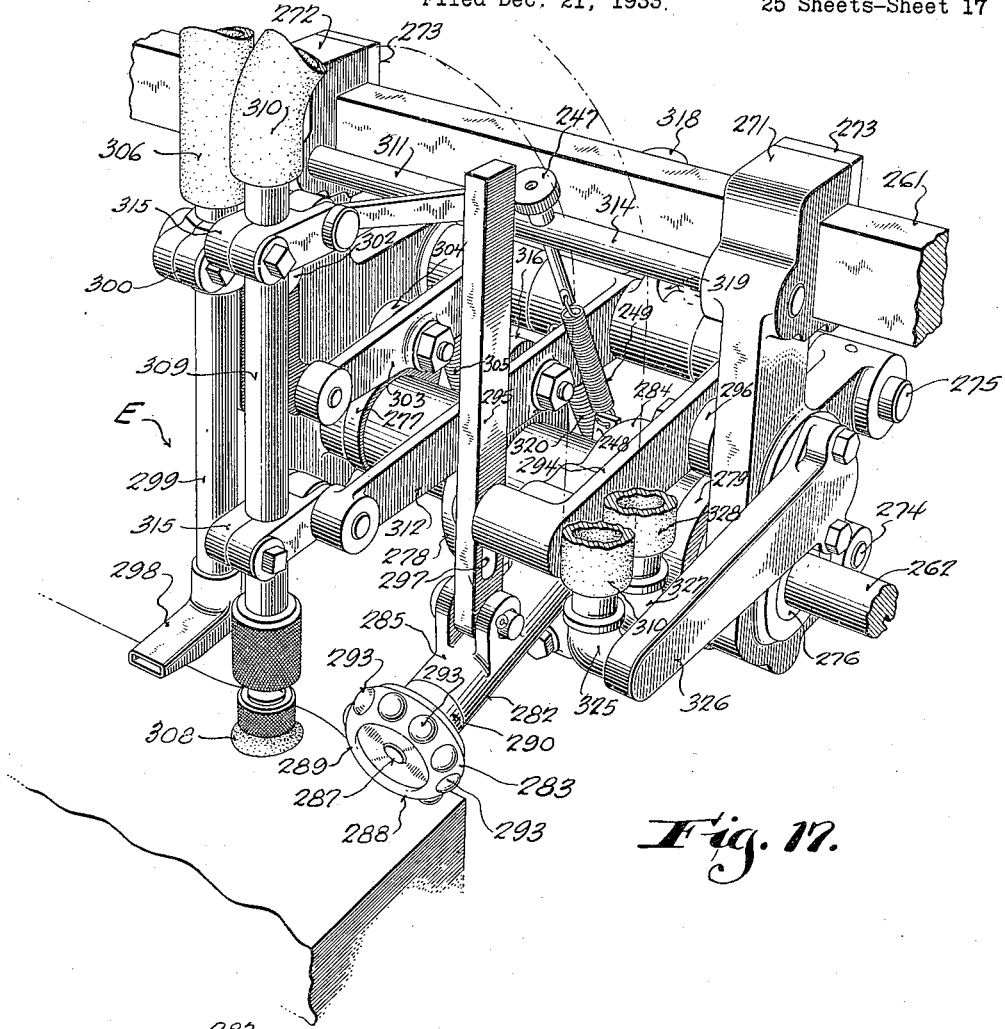
Figure 17 is a perspective view showing one of the rear suckers and its associated mechanism.
Figure 18:
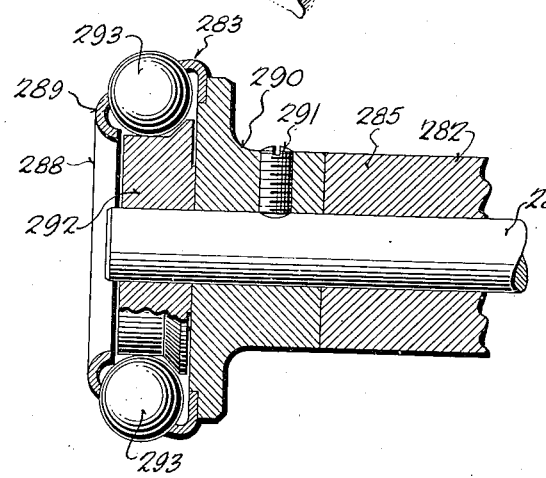
Figure 18 is a detail view of one of the combing wheels.
Figure 21:
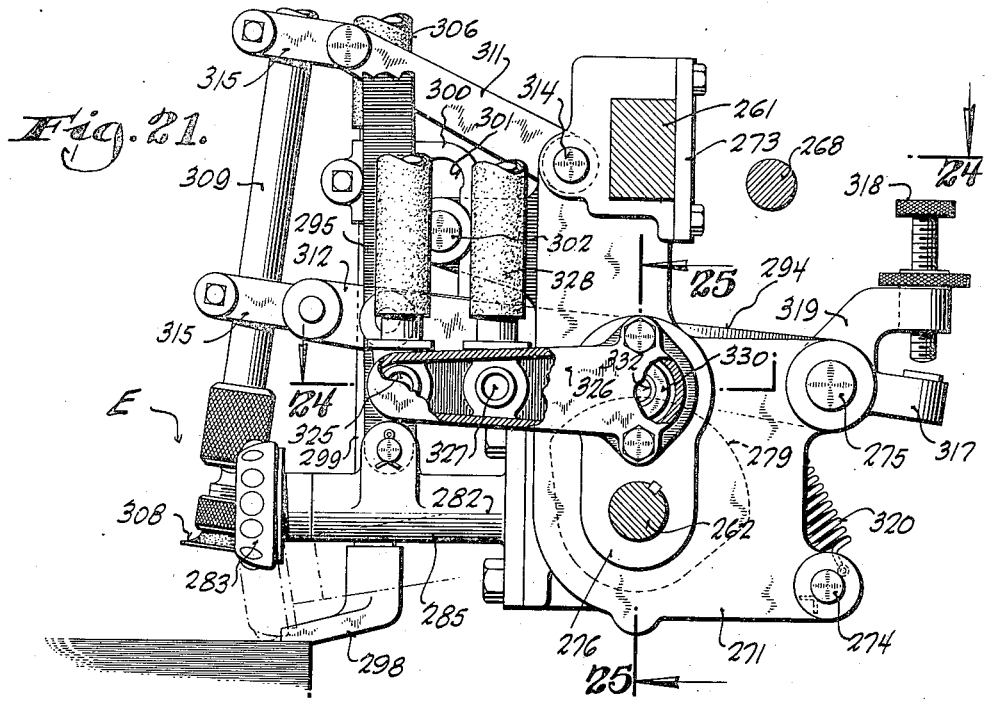
Figure 21 is a section taken through Figure 10 on the plane of the line 21—21, and showing one of the combing wheels and rear suckers and the pneumatic means for holding the combing wheel in its elevated position.
Figure 22:
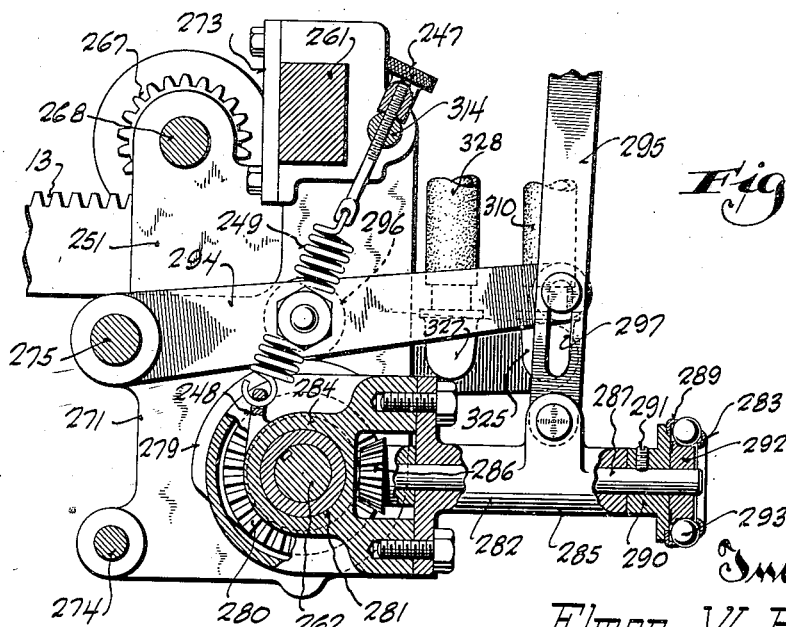
Figure 22 is a detail section view taken through Figure 10 on the plane of the line 22—22 and showing particularly the drive for the combing wheel.

As best shown in Figure 12, this main delivery roll 81 is located juxtapose the forward edge of the top cross piece 24 of the barrier 21, so that as the sheets are carried forward by the front suckers, their leading edge portions will be deposited on the roll 81. Tapes 82 are trained about the roll 81 to be driven thereby and to carry the sheet forward into the delivery mechanism.

The pinion 78 drives a transverse shaft 83 journalled in bearings 84 fixed to the transverse rectangular bar 45. The shaft 83 mounts caliper rolls 85 over which the sheets travel as they pass forwardly, the caliper rolls being slidably splined to the shaft so as to enable adjustment thereof to accommodate different widths of sheets. The means for holding the rolls in adjusted position and the associated caliper mechanism will be described hereinafter.

The large gear 59 has a box cam 86 formed in its outer face to impart rocking motion to a lever 87 medially pivoted on a stub shaft 88 fixed in the side frame 40. The lower end of the lever 87 carries a cam follower to track in the box cam, and the upper end of the lever has a stud 89 onto which a claw 90 hooks to transmit the rocking motion of the lever 87 to a bell crank lever 91 fixed to a shaft 92 extending transversely across the tops of the front columns and journalled in bearings carried by the front column caps. Oscillatory motion is thus imparted to the shaft 92, which motion is utilized to effect the desired action on the part of the front suckers as will be hereinafter described.

Fixed to the main cam shaft on the gear side of the feeder directly inwardly of the side frame 40, are five cams 95, 96, 97, 98 and 99. These cams regulate the operation of the valves which control the functioning of the front and rear suckers and the blowers as will be hereinafter described.

On the opposite or feed side of the feeder, the main cam shaft mounts a cam 100 on the inside of the adjacent side frame 41 and three cams 101, 102, 103 on the outside of the side frame 41. The cam 100, as best shown in Figure 7, oscillates a transverse shaft 104 journalled in bearings carried by the side frames, through the medium of a lever 105 fixed to the shaft and carrying a cam follower at its outer free end to track on the cam 100.

A compression spring 106 serves to maintain the cam follower in engagement with the cam 100. This spring is confined between a fixed stud 107 secured to the side frame 41 and a collar 108 fixed to a rod 109 on which the spring is mounted. The rod 109 is slidably mounted in the stud 107 and has its opposite end bearing against a short boss 110 formed as part of the lever 105.

The transverse shaft 104 has two or more levers 111 slidably splined thereon and located as determined by the width of the sheet. The free ends of these levers 111 freely rotatably mount contact wheels 112 having rubber treads and adapted, upon oscillation of the shaft 104, to be lowered and raised into and out of contact with the roll 81 to hold the sheet in frictional driving engagement with the roll and the tapes trained thereover. Obviously, the cam 100, which controls the rising and falling of the contact wheels 112, is so timed that the contact wheels are lowered into engagement with the roll 81 through the sheet directly after the leading edge portion of a sheet is positioned over the roll 81.

The cams 101, 102 and 103 respectively actuate the sheet straightener, the slow down roll, and the pile elevator.

The sheet straightener, which is located in the delivery mechanism, consists merely of a plurality of fingers 113 keyed to an oscillatory shaft 114. At its feed side end, the shaft 114 has a lever 115 fixed thereto, which is connected through a link 116, with one end of a medially pivoted lever 117. The opposite end of the lever 117 is connected through a link 118 to one arm 119 of a bell crank lever 120. The bell crank lever 120 is pivotally mounted on a stub shaft 121 fixed to the adjacent side frame 41.

The other arm 122 of the bell crank lever 120 mounts a roller to track the cam 101. Upon each revolution of the cam shaft, the high spot of the cam 101 through the bell crank lever 120 and the linkage connected thereto, momentarily raises the sheet straightening fingers into their active positions. The timing of the cam 101 is such that the sheet straightening fingers are elevated to their active positions at the proper instant to engage the forward edge of the sheet as it is brought down on the delivery tapes to slightly retard its forward motion. The action of the sheet straighteners is such that for an instant after engaging the sheet, they move forward with the sheet, but at a slower speed than the delivery tapes so that the sheet is straightened, and then accelerate and swing down below the path of the sheet.

The cam 102, which actuates the slow down roll transmits its motion to the slow down roll through a bell crank lever 123. One arm of the bell crank lever 123 carries a cam follower and the other arm is connected through a link 124 with the slow down roll actuating means to be hereinafter described.

AUTOMATIC PILE ELEVATOR (Figures 2a, 4, 6, and 36. Sheets Nos. 2, 5, 7 and 8)

The cam 103 has two functions related to the operation of the automatic pile elevator. It continuously drives the means for turning the worm shaft, and also initiates the functioning of the worm shaft driving means. For carrying out its first function a crank pin 125 is fixed thereto. Attached to the pin 125 is a pitman 126 to oscillate a pawl carrier 127, pivotally mounted on the adjacent end of the worm shaft 20. Between the pawl carrier 127 and the outer end of the adjacent bearing for the shaft 20 which forms part of the column cap, is a sprocket wheel 128, and a ratchet wheel 129, the ratchet wheel being directly adjacent the pawl carrier. Both the ratchet wheel and the sprocket are fixed to the worm shaft 20 and the sprocket wheel is preferably enclosed within a protecting housing 130 mounted on the column cap.

A pawl 131 is pivotally mounted as at 132 from the pawl carrier to lie above the ratchet wheel and engage the same, when permitted, by a mask 133. The mask 133 is formed by the outer curved end portion of a lever 134 pivotally mounted as at 135 from the adjacent rack bar 13, and provides a track on which a roller 136 carried by the free end of the pawl rides. In its operative raised position, the mask is so disposed with respect to the center of the shaft 20, as to hold the pawl out of engagement with the ratchet wheel, but upon dropping out of the way, permits engagement of the pawl with the ratchet wheel.

Inasmuch as the main cam shaft 57 and consequently the cam 103 is continuously turning, it follows that the pawl carrier 127 and the pawl are constantly being oscillated. Normally, the oscillation of the pawl has no driving effect upon the shaft 20, but under certain conditions, as determined by the height of the pile, the mask drops out of the way and permits momentary engagement of the pawl with the ratchet wheel so as to turn the shaft 20 a slight distance and elevate the pile to its proper height.

The control for the mask 133 incorporates the cam 103 in the following manner: Tracking on the cam 103 is a follower 137 carried by one end of a lever 138, which is medially pivoted as at 139. The opposite end of the lever 138 has a tension spring 140 connected thereto which yieldably tends to cause the roller 137 to track the cam 103. Also connected to said opposite end of the lever 138 is a link 141, which extends upwardly to connect with one arm of a bell crank lever 142.

The bell crank lever 142 is fixed to a shaft 143 extending transversely from the feed side inwardly to a bracket 144 adjustably mounted in the center of the feeder. Fixed to the shaft 143, adjacent the bracket 144, is a curved lever arm 145 (see Figure 36) which overhangs the adjacent portion of the pile and carries a pile feeler 146' at its outer free end. The lower end of the pile feeler has a roller 147', which is adapted to engage the top of the pile, and a link 148' connected with the medial portion of the feeler and receiving support from the bracket 144, serves to hold the feeler in a substantially vertical position as it is raised and lowered by oscillation of the shaft 143. Oscillation of the shaft 143 is produced by the motion of the lever 138 in following the cam 103, which is merely a round disc having a flat portion, the spring 140 pulling the link 141 down to turn the shaft 143 in one direction whenever the flat portion of the cam aligns with the roller 137.

The direction of rotation imparted to the shaft 143 by the spring 140 is such as to engage the feeler with the top of the pile so that the force which causes the feeler to move down onto the pile is not positive but yieldable. Consequently, the degree of rotation which it is possible to impart to the shaft 143 in consequence to the tendency of the spring 140 to cause the cam follower 137 to follow the flat portion of the cam 103, is limited and determined by the height of the pile. As the sheets are removed from the pile, the degree of possible rotation of the shaft 143 increases and when a predetermined maximum degree of rotation is permitted, the bell crank lever 142, through an adjustable stop 146, moves a lever 147 to lift a latch bar 148 out of operative position.

The lever 147 is pivotally mounted on the feed side front column cap as at 149 and the latch bar 148 is carried directly by the lever 147. The outer end of the latch bar 148 is notched to define a sharp shoulder 150, with which, when the latch bar is in operative position, a stud 151 carried by the arm 152 of the bell crank lever 134 engages.

In its normal operative position, the latch bar 148 holds the bell crank lever 134 in its position maintaining the mask 133 in its raised or active position, but when the latch bar 148 is lifted out of engagement with the stud 151, the lever 134 turns by gravity about is pivotal mounting 135, and permits the operative engagement of the pawl with the ratchet wheel, whereupon the next successive forward stroke of the pawl turns the worm shaft a slight degree to elevate the pile back to its proper height.

To reset the mask, the oscillation of the pawl carrier is imparted to the lever 134, through a link 153. One end of the link 153 is connected to a short lever 154, forming part of the pawl carrier and the opposite end of the link is slidable in a stud carried by a downward extension 155 of the lever 134.

A collar 156 on said last mentioned end of the link serves to lift the lever 134 and the mask carried thereby to its raised position and sufficiently far to re-engage the stud 151 with the latch bar 148. Thereafter, the oscillation of the pawl carrier 127 merely reciprocates the rod 153 with respect to the stud carried by the lever extension 155 without having any effect thereon until the latch bar 148 is again tripped as a result of the lowering of the pile top.

PUMPS AND VALVE MECHANISM (Figures 3a, 9, 28, 29, 30 and 39. Sheets Nos. 3, 10, 20 and 24)

The pumps and the valve mechanism are mounted on the shelf 27, which is disposed beneath the mechanism head. The support for the shelf comprises U-straps 157 embracing the front columns and anchored to the adjacent flange of the shelf, and auxiliary supporting legs 158 which extend down to the floor from the front edge of the shelf.

Mounted on the shelf is a pressure pump 160 and a suction pump 161, both of the rotary type having drive shafts 162 and 163 respectively. The drive shafts of the pumps have sprockets 164 which are connected through chains 165 with sprockets 166 fixed to a jack shaft 167 journalled in bearings carried by standards 168 extending upwardly from the shelf. The inner end of the jack shaft is drivingly connected through a silent chain drive 169 with a drive motor 170 also mounted on the shelf.

The outer end of the jack shaft 167 has a pinion 171 fixed thereto to provide power means for rapidly raising and lowering the pile platform under manual control, as will be hereinafter described.

Mounted on the gear side end of the shelf 27, directly beneath the cams 95 to 99 inclusive, is a valve housing 172, and suspended beneath the shelf is an air pressure storage tank 173. The valve housing 172 consists of a body 174 resting directly on the shelf and secured thereto, and a cover 175 closing the open side of the body.

The interior of the body 174 and also the cover 175 is divided by vertical partitions 176 and 177 into a suction side, and a pressure side, and the body is divided by a horizontal partition 178 into inlet and outlet chambers 179 and 180 respectively. The inlet chamber of the pressure side is communicated through a pipe line 181 with the pressure storage tank and the inlet chamber of the suction side is communicated with the suction pump through a pipe line 182.

The outlet chambers 180 of both the pressure and suction sides are divided by vertical walls 183 so that there are two compartments 184 and 185 in the outlet chamber of the suction side and two compartments 186 and 187 in the outlet chamber of the pressure side.

The inner wall 188 of the cover which closes the open front of the body, has four ports 189, two communicating the inlet chamber 179 of the suction side with the outlet chamber 180 of the suction side, and two communicating the inlet chamber 179 of the pressure side with the outlet chamber of the pressure side. These ports are normally closed by valves, there being two suction valves 190 and 191, and two pressure valves 192 and 193. All of the valves are of the poppet type and are spring urged to closed position.

The compartment 184 of the suction outlet chamber has a suction line 194 communicated therewith and leading therefrom to the front suckers, and the compartment 185 of the suction outlet chamber communicates with a suction line 195 which leads to the rear suckers.

In the present instance, there is but one pressure line 196, which leads from the compartment 187 of the outlet chamber 180 of the pressure side to the blowers located adjacent the rear suckers. If desired, the remaining outlet compartment 186 of the pressure side may be utilized to conduct air to an additional set of blowers, which in the present instance, have not been shown.

As stated, all of the valves are normally closed, and are opened by the cams 95, 96, 98 and 99. The manner in which the cams function and transmit their motion to the valves will now be described. Pivotally mounted as at 197 from the valve housing is a carrier arm 198. At a medial point, the arm 198 mounts a cross shaft 199, which projects on opposite sides thereof. Pivotally mounted on the shaft 199 are four valve rocker arms 200, 201, 202 and 203, arranged to depress the valves 190, 191, 192 and 193 respectively. Each of the valve rocker arms has a cam follower at its upper free end to ride on its respective cam so that whenever the high spot of its cam comes around, the particular valve controlled thereby will be opened.

The cams 95 and 96 are identical and actuate the rocker arms 203 and 202 respectively to open the pressure controlling valves. The cam 98 actuates the rocker arm 201 to open the valve controlling the suction for the front suckers, and the cam 99 acts on the rocker arm 200 to open the valve controlling the suction for the rear suckers.

Inasmuch as the carrier arm 198 which carries the shaft 199 forming the pivotal support for the valve rocker arms is movable about the pivot 197, means must be provided to hold the same in its operative position illustrated in Figure 28. For this purpose, a retainer lever 204 is provided. The retainer lever is pivotally mounted on an extension of the stub shaft 52 at the gear side of the machine, and carries a latch arm 205 at its outer end. The end of the latch arm has a hook to engage over a keeper stud 206 carried by the arm 198 to hold the arm 198 against counter-clockwise movement about its pivotal mounting 197 with respect to Figures 28 and 39.

To maintain the hooked end of the latch 205 engaged with its keeper stud 206 and to yieldably tend to move the arm 198 counterclockwise about its pivotal mounting, a tension spring 207 is attached to the lower end of the arm 198. Upon release of the latch 205, effected by lifting the same out of engagement with the stud 206, the spring 207 pulls the carrier arm 198 to its position shown in Figure 39, whereupon the shaft 199, which affords the pivot point for the valve rocker arms is moved away from the valves and the cams to such an extent that the cams have no effect thereon and the valves remain closed. Release of the latch 205 to effect cessation of the valve operation, is effected in a manner to be hereinafter described.

To reset the carrier arm and reengage the latch 205 with the stud 206, is the function of the center cam 97. This cam engages a roller 208 carried by the upper free end of the arm 198 and the high point thereof moves the arm a distance sufficient to permit re-engagement of the latch 205 with the stud 206 in the event the latch is not held in its inoperative position.

FRONT SUCKERS

*(Figures 1, 2a, 3a, 9, 12, 12a, 12b, 12c, and 13. Sheets Nos. 1, 2, 3, 10, 12 and 13)*

There are two or more front suckers to pick up the front edge portion of the sheet and forward it on to the delivery roll 81. The motion of these suckers is produced entirely by the oscillation of the shaft 92, which as hereinbefore noted, is oscillated by the rocking lever 87 actuated by the box cam 86, the lever 87 being connected with the shaft through the bell crank lever 91 and the claw 90. The connection of the claw 90 with the stud 89 carried by the rocking lever 87 is releasable and to maintain the same in engagement, a tension spring 211, having one end anchored to a stud 212 and its other end attached to the bell crank lever 91, as at 213 is provided.

The action of the spring 211 at all times yieldably tends to turn the shaft 92 in a clockwise direction as viewed from the gear side of the feeder and thus maintains a tension on the claw 90 to hold the same in engagement with the stud 89. The engagement of the claw 90 with the stud 89 limits the clockwise rotation of the shaft 92 under action of the spring 211, but when the claw 90 is disengaged from the stud 89, as will be hereinafter described, clockwise rotation of the shaft 92 is limited by the engagement of an arm 214 fixed to the shaft 92, with the tie rod 10, (see Figure 8).

Each sucker assembly comprises a lever member 215 having an elongated hub 216, which is slidably splined to the shaft 92, and may be secured thereto at any point in its length, by means of a set screw 217. Freely journalled on the hub 216 is a carrier 218 having an arm 219 extending forwardly to engage and normally rest on the adjacent tie rod 10. The carrier member also has a bored split rearward projection 220 in which the upper end of a tube 221 is secured, and extending downwardly from its hub, the carrier has a lever 222, the outer free end of which mounts a stud 223 against which a spring 224 bears.

The spring 224 is mounted on a rod 225 slidable through the stud 223 and having its upper end bearing against a supporting arm 226 which bears against the underside of the tie rod 10 at its outer end and embraces the lower half of the hub 216 between the carrier member 218 and the flanged end of the hub 216. The upper end of the spring 224 bears against a stop 227 fixed to the rod 225 so that the spring is confined between this stop and the stud 223 and tends to maintain the carrier member in its position shown in Figure 12 with its arm 219 engaging the top of the tie rod 10.

The tube 221 extends downwardly toward the top of the pile, and telescoped over this tube is an outer tube 228. The lower end of the outer tube 228 is closed by a tubular bushing 229 to the lower end of which a rubber suction cup 230 is attached. The lower extremity of the inner tube 221 has a bushing 231 secured thereto and threaded in the bore of the bushing 231, is the lower end of a pipe 232, the upper end of which projects from the open top of the inner tube 221, to be communicated with the suction line 194 by a flexible hose 233.

The outer tube 228 carrying the rubber suction cup is slidable up and down on the inner tube 221 and when the outer lower end of the suction cup is closed by a sheet of paper and suction is established with the line 194, the outer tube will be elevated automatically.

The outer tube with its suction cup is also operable by a mechanical linkage comprising a link 234 having its lower end attached to the bushing 229 and its upper end connected to the long arm of a bell crank lever 235. The bell crank lever 235 is pivotally mounted as at 236 from the outer end of the arm 219. The short arm of the bell crank lever 235 has a rod 237 connected thereto, the opposite end of which is slidable in a stud 238 carried by the lever 215.

Confined between the stud 238 and a stop washer 239 at the opposite end of the rod, is a compression spring 240. The spring 240 tends to turn the bell crank lever 235 in a clockwise direction with respect to Figures 12, 12a and 12b to permit the outer tube 228 and the suction cup carried thereby to drop down onto the pile, but the action of the spring 240 is limited by the engagement of a head 241 on the end of the rod 237 with the stud 238. Consequently, when the elements are in their positions illustrated in Figure 12, the outer tube and suction cup will be held in its raised position as shown.

Projecting from the lever member 215, to engage the undersurface of the arm 219 of the carrier member 218, is a stud 242. Through this stud, rotation of the lever member 215 in a clockwise direction, may be imparted to the carrier member 218 as shown in Figure 12b.

Figure 12 illustrates the positions of the sucker elements with the sucker just about to descend into contact with the top of the pile. Descent of the suction cup results upon the completion of the counterclockwise oscillation of the shaft 92. During this further degree of counterclockwise oscillation of the shaft 92 and consequently the lever member 215, the stud 242 leaves the underside of the arm 218 and in moving its stud 238 permits the bell crank lever 235 to swing about its pivot and allows the outer tube 228 to descend.

Immediately upon contact of the suction cup with the top of the pile, the effect of suction obtained from the line 194 lifts the outer tube 228, the spring 240, which is comparatively light, compressing to allow this automatic elevation of the sucker tube 228. Directly following the elevation of the sucker tube, the shaft 92 begins its return oscillation, moving in a clockwise direction until the stud 242 carried by the lever member 215 picks up the arm 219 of the carrier member and swings it about its mounting on the hub 216 to a position illustrated in Figure 12b.

During this rocking movement of the carrier member, the entire sucker structure is swung forwardly to carry the sheet picked up thereby forward sufficiently far to engage its leading edge portion between the delivery roll 81 and the contact wheels 112 so that when the contact wheels 112 descend, the sheet thus forwarded will be carried into the delivery mechanism, it being understood that the suction is shut off at the completion of the forward stroke of the suckers so that the sheet carried thereby will be released.

In the event the feeder is operating without suction, the bell crank 235 and the link 234 pick up the outer suction tube 228 and the suction cup before the forward stroke of the sucker is commenced to avoid dragging the cup across the top of the pile.

REAR SUCKERS AND ASSOCIATED MECHANISM (*Figures 1, 2a, 3a, 10, 11, 17, 18, 19, 20, 21, 22, 23, 24, and 25. Sheets Nos. 1, 2, 3, 11, 16, 17, 18, 19 and 24*)

The rear suckers "E" of which there are two in the present embodiment, are supported from the rack bars 13 to have forward and backward adjustment to accommodate sheets of different length.

The actual supporting structure for the rear suckers comprises two carrying brackets 250 and 251, the former forming part of a gear box and being located on the gear side of the machine and the latter being located on the feed side of the machine. Each bracket is slidably mounted on one of the rack bars 13.

The bracket 250 has a stub shaft 253 mounted thereon and the bracket 251 carries a stub shaft 254 in axial alignment with the stub shaft 253. The common axis of the stub shafts intersects the axis of the longitudinal drive shaft 72.

Journalled on the outer end of the stub shaft 253 is a bevel gear 255 having a spur gear 256 rigidly connected thereto. The bevel gear 255 meshes with a similar bevel gear 257 slidably splined on the drive shaft 72, the bevel gears being maintained in proper meshed relationship by a bearing 258 fixed to the bracket 250 so that regardless of the location of the supporting structure for the rear suckers, a driving connection will be maintained between the shaft 72 and the spur gear 256.

Pivotally mounted on the inner ends of the stub shafts 253 and 254 are brackets 259 and 260 respectively. The bracket 259 serves as part of the gear box closing the open inside face thereof. Rigidly connecting the two brackets 259 and 260, is a rectangular cross bar 261, which is positioned rearwardly of the common axis of the stub shafts 253 and 254 with the ends thereof resting on the tops of the brackets 250 and 251.

Also connecting the brackets 259 and 260 and journalled in bearings therein, is a transverse drive shaft 262. The gear side end of the drive shaft 262 has a gear 263 fixed thereto to mesh with the spur gear 256 when the movable supporting structure comprising the brackets 259 and 260 and the transverse rectangular bar 261 is in its normal position with the ends of the bar resting on the tops of the brackets 250 and 251. For a purpose to be later described, this rigid supporting structure is movable upwardly about the common axis of the stub shafts 253 and 254.

The assembled supporting structure is adjustable along the rack bars 13 by pinions 267 fixed to the opposite ends of a transverse shaft 268 journalled in bearings carried by the brackets 250 and 251. The feed side end of the shaft 268 has a hand wheel 269 fixed thereto to enable the application of turning force to the shaft and consequently the pinions, a clamping screw 270 carried by the bracket 251 providing means for locking the supporting structure in any adjusted position.

The suckers per se are transversely adjustably carried by the transverse bar 261. The two units are identical except that they are right and left, and each comprises a carrier frame consisting of side brackets 271 and 272 recessed at their upper ends to embrace the transverse bar 261. Clamping plates 273 screwed to the brackets across their recesses serve to lock the brackets on the supporting bar in adjusted position.

The carrier brackets are rigidly connected by tie rods 274 and 275 secured in bosses extending from the rear of the brackets. Both brackets are also provided with bearings 276 to freely rotatably receive the transverse drive shaft 262. Slidably keyed to the drive shaft 262 between the carrier brackets are three cams 277, 278, and 279. The hubs of these cams span the distance between the carrier brackets so that the cams are held against endwise shifting with respect to the brackets.

The hub of the cam 279 has a bevel gear 280 fixed thereto or formed as an integral part thereof. The hub of the cam 278 is turned down adjacent the bevel gear 280 to provide a bearing 281 for a combing wheel support 282, the outer end of which carries a combing wheel 283. The support 282 is preferably made in two parts, a casting 284 bored to receive the bearing 281 and an extended arm 285. The casting is cored out to afford space for a bevel pinion 286 fixed to a shaft 287 which is journalled in the arm. The two parts of the combing wheel support are secured together by cap screws so that upon their assembly, the bevel pinion 286 is meshed with the bevel gear 280.

The combing wheel 283, which is fixed to the outer end of the shaft 287 to be driven thereby, comprises a ball bearing race 288, the retainer 289 of which is fixed to a bushing 290, which in turn is secured by a set screw 291 to the shaft 287. Loosely mounted on the extreme outer end of the shaft 287 is a spool 292 on which the inner peripheries of the balls 293 track.

The support for the combing wheel is pivotal about the axis of the shaft 262 to engage the combing wheel with the top of the pile at the proper time, the determination of which is the function of the cam 279. For this purpose, a lever 294 pivoted on the tie rod 275 and connected at its outer free end with a link 295, is provided. At its intermediate portion, the lever 294 carries a cam follower roller 296 to track on the cam 279 so that the lever 294 rises and falls as the roller follows the cam 279. When the low portion of the cam 279 passes under the roller 296, the combing wheel is let down onto the pile of sheets.

A tension spring 249, having one end connected to an ear 248 formed as part of the casting 234 and having its opposite end adjustably anchored by means of a screw and nut 247 to a tie rod 314, yieldably tends to swing the combing wheel down into engagement with the top of the pile. The action of the spring 249 is opposed by the action of the cam 279 lifting the lever 294 through the connection of the lever with the combing wheel carrier by the link 295.

To enable the spring 249 to engage the combing wheel with the pile without restriction, the connection between the lever 294 and the link 295 embodies a degree of lost motion afforded by a slot 297 in the link. This slot is of sufficient length so that when the combing wheel is in engagement with the top of the pile and the roller 296 is riding on the low portion of the cam 279, the end of the lever 294 will be located intermediate the ends of the slot 297.

The function of the combing wheel is, of course, to buckle and separate the uppermost sheets to permit the rear suckers to take hold of the topmost sheet. To facilitate the action of the combing wheel, the top of the pile is held down at a short distance inwardly therefrom, by a toe-shaped air discharge nozzle 298. This nozzle is supported on the lower end of a vertical tube 299, which is carried by a supporting member 300 (see Figure 23).

The supporting member 300 has an upright elongated slot 301 to slidably receive a stud 302 carried by the adjacent carrier bracket 272. At its lower end the supporting member 300 is pivotally connected to the outer free end of a lever 303 journalled on the tie rod 275 and carrying at its medial portion a roller 304 to track on the cam 277.

A tension spring 305, having one end connected to the lever 303, and its other end anchored to the tie rod 274, holds the lever and consequently the nozzle 298 down. The shape of the cam 277 with respect to the cam 279, which controls the rising and falling of the combing wheel is such that when the combing wheel is down and operating, the roller 304 will be out of contact with the cam so that the full force of the spring 305 is imparted to the nozzle to clamp the same down onto the pile of sheets.

As the high point of the cam 277 passes under the roller 304, it lifts the nozzle 298 to its dotted line position shown in Figure 23, directing the blast of air which is emitted therefrom toward the top edge of the pile of sheets and under the uppermost sheet, the tube 299, which carries the nozzle being connected through a flexible hose 306 with a transverse pipe which forms part of the air pressure line 196 and is carried by brackets 307 fixed to the cross bar 261.

During the time the combing wheel is down on the pile of sheets and is functioning to buckle the uppermost sheets as best shown in Figure 19, the rubber suction cup 308 of the rear sucker per se descends down onto the buckled portion of the pile of sheets and picks up the top sheet. The rubber suction cup is adjustably carried at the lower end of a tube 309 the upper end of which is connected through a flexible hose 310, with a transverse pipe forming part of the suction line 195 and also carried by the brackets 307.

The tube 309 is supported for up and down movement by two links 311 and 312. The link 311 is pivotally mounted as at 313 on a tie rod 314 connecting the carrier brackets and has its outer free end pivotally connected to a clamp 315 secured to the upper portion of the tube. The lever 312 is pivotally mounted at its rear end on the tie rod 275, and is connected to a second clamp 315 secured to the lower portion of the tube.

Carried by the lever 312 at a medial point is a cam follower 316 arranged to track on the cam 278, and extending rearwardly from the lever beyond the shaft 275 is a stop lug 317 which is engageable with an adjustable stop screw 318 carried by a short bent lever 319 non-rotatably fixed to the shaft 275. The engagement of the lug 317 with the end of the screw 318 limits the downward movement of the sucker tube and affords a convenient adjustment for accurately determining the degree of pressure with which the suction cup engages the sheet.

A tension spring 320, having one end attached to the lever 312 and its other end anchored to the tie rod 274, yieldably pulls the lever 312 down a distance determined either by the engagement of the stop lug 317 with the screw 318, or the engagement of the cam follower 316 with the cam 278.

The relationship of the cams 277, 278 and 279 is such that during the operation of the feeder, the combing wheel descends onto the pile to buckle the upper sheets, being assisted in this function by the blower nozzle 298, which, as hereinbefore noted, serves during this time as a pressure foot pressed down onto the top of the pile at a distance inwardly from the combing wheel.

After the combing wheel has had an opportunity to buckle the sheets, the sucker, which is disposed between the combing wheel and the blower nozzle, descends down onto the pile and automatically picks up the topmost sheet. Directly thereafter, the combing wheel and also the blower nozzle 298 leave the top of the pile, leaving the topmost sheet suspended from the sucker.

While the sheet is held up by the sucker, the blower nozzle finishes its cycle of motion, by again dropping down onto the pile, but underneath the top sheet. In this position, a blast of air is discharged from the nozzle until the front suckers have picked up the sheet and started to carry the same forwardly.

As hereinbefore noted, the sucker tubes 309 are communicated through flexible hoses 310 with the suction line 195, but the communication is not direct. The end of the flexible hose 310 instead of contacting directly with the suction line 195 is attached to a port 325 of an air chamber 326, mounted on the outer face of the carrier bracket 271. A second port 327, leading from the air chamber 326, has a flexible hose 328 attached thereto which leads to the suction line 195.

The sucker tubes are thus communicated with the suction line through the air chamber 326 so that a partial vacuum exists within the air chamber whenever the suction is turned on and the feeder is in operation. This partial state of vacuum within the air chamber 326, or rather the cessation thereof when the suction is turned off, is utilized to hold the combing wheel elevated.

For this purpose, a piston 330 is slidably mounted in a bore 331 in the carrier bracket 271. One end of the bore communicates with the interior of the air chamber 326 so that the piston 330 is subjected to the effect of the suction therein and will be drawn into the air chamber against the action of a compression spring 332 whenever the state of partial vacuum exists within the air chamber.

The outer end of the piston has a lug 333 extended therefrom, which, when the piston is in its spring projected position, is disposed in the path of a head 334, on the stud which mounts the roller 296 on the lever 294. The relative location of the lug 333 with respect to the motion of the lever 294 is such that, when the lever is raised to its uppermost position by the cam 279, the head 334 of the stud will be entirely above the lug 333 and thus permit the disposition of the lug 333 therebeneath, to prevent descent of the lever 294 and consequently the combing wheel. As soon as suction is again established, and the feeding operation is to be resumed, the piston 330 carrying the stop lug 333 will be drawn to its inoperative position.

This manner of rendering the combing wheel inoperative is simple, positive, and properly coordinated with the feeding action.

INDEPENDENT MANUALLY CONTROLLED PILE ELEVATOR (Figures 2a, 6, 7, 8, 9, 31, 32, and 33. Sheets Nos. 2, 7, 8, 9, 10 and 21)

Power driven mechanism is provided for rapidly elevating or lowering the pile or its carrying platform. This mechanism is manually controlled and functions entirely independent of the automatic pile elevator, hereinbefore described. It is driven at the will of the operator, in either direction, from the pinion 171 fixed to the outer end of the pump drive jack shaft 167 by engaging either of two meshing gears 335 and/or 336 with the pinion 171. The gears 335 and 336, are carried by a lever member 337 pivotally mounted on a stub shaft 338 journaled in a suitable bearing carried by the standard 168 which also provides a bearing for the adjacent end of the jack shaft 167.

In the normal neutral position of the lever member 337 neither one of the gears 335 or 336 meshes with the pinion 171, but upon clockwise movement of the lever member about the axis of the stub shaft 338 by means of its handle 339, the gear 335 is meshed with the pinion 171 to drive a large gear 340 fixed to the shaft 338 in a counterclockwise direction as viewed from the feed side of the feeder (see Figure 31).

Also fixed to the shaft 338 is a sprocket wheel 341, which upon rotation of the shaft through the gear connection just established, transmits a like rotation to the sprocket 128 fixed to the worm shaft 20 through the medium of a sprocket chain 342. This counterclockwise rotation of the worm shaft 20 imparts rotation to the shafts 17 in a direction to raise the pile.

To lower the pile, the lever member 337 is swung to its opposite position meshing the gear 336 with the pinion 171 so that the gear 335 acts as an idler and changes the direction of rotation of the gear 340. The lever member 337 is normally held in its neutral position by a releasable lock comprising, a screw 343 threaded in the adjacent wall of the standard 168 and having a head 344 adapted to enter a counterbore 345 formed in the lower end portion 346 of the lever member. A hand wheel 347 on the outer end of the screw provides means for disengaging the head 344 from the counterbore to release the lever member for movement into either of its operative positions, the lower end portion 346 of the lever member having an arcuate slot 348 to accommodate the screw 343.

At the opposite ends of the arcuate slot there are counterbores 349 and 350, in which the head 344 of the screw may be engaged to secure the lever member in either of its positions to effect either descent of or elevation of the pile.

Directly associated with the lock screw for holding the lever 337 in any of its three positions, is means to positively render the automatic pile elevating mechanism inoperative. This means comprises a lever 351 medially pivotally mounted as at 352, and having one end 353 bored to receive the lower end of a push rod 354, the upper end of which is attached to the mask carrying lever 134. A collar 355 is fixed to the lower end portion of the rod 354 to be engaged by the end 353 of the lever 351 in the event the mask lever is down and the lever 351 is actuated in a manner now about to be described.

A lug 356 is formed on the end of the lever 351 opposite its connection with the rod 354. This lug, as best illustrated in Figures 32 and 33, lies in the path of the screw head 344 as the screw is turned to withdraw the head out of any one of the counterbores in which it may be engaged so that upon such outward axial movement of the screw, the lever 351 will be moved about its pivotal mounting to elevate its end 353 and consequently the mask lever if it happens to be in its lowermost inoperative position.

The lower end portion 346 of the lever member 337, which is circumferential to the axis of the shaft 338, also has two outwardly projecting lugs 357 adapted to engage a rounded projection 358 on the lever 351 upon movement of the lever member 337 out of its normal neutral position, to depress the adjacent end of the lever 351 and hold the same down after the screw head 344 is moved out of engagement with the lug 356.

The rocking movement of the lever 351, as described, besides serving to lift the mask lever in the event this member in its lowermost inoperative position, also has an additional safety function, as now about to be described.

As stated, the drive for the rapid pile elevating and lowering means is obtained from the pump drive jack shaft, which in turn is driven from the motor 170. The starting and stopping of the motor is controlled by a push button control box 359 of conventional construction. As is customary, in push button controls of this character, a "start" button 360, and a "stop" button 361 are provided.

Inasmuch as the specific electrical circuits through which the depression of these buttons effects the starting and stopping of the motor forms no part of this invention, it need not be shown nor described. Suffice it to say that the motor is started by depressing the "start" button 360 and is stopped by depressing the "stop" button 361, and that if the "stop" button is held down, the circuit to the motor can be maintained closed only by depressing and holding the "start" button down. In other words, as long as the "stop" button is held down, it is necessary to hold the "start" button down, if it is desired to run the motor.

Consequently, with the "stop" button held down, it is possible to use the "start" button of the control box as an "inching" control so that the motor will operate only as long as the "start" button is held down. This feature is utilized to insure the operator's presence at the pile end of the feeder during the actual raising and lowering of the pile.

To this end the control box 359 is mounted in such a position that the depressible end 362 of the lever 351 is directly over the "stop" button 361. Hence, when the lever 337 is shifted into either of its operative positions, the "stop" button of the switch control box will be depressed to stop the drive motor 170 if this motor is in operation. As long as the lever member is in either shifted position, the motor can be operated only by holding the "start" button 360 down and as the control box 359 is so located that the operator can readily observe the position of the pile, it is highly improbable that the pile will be raised or lowered too far.

In the event the pile is elevated beyond its desired height and the top of the pile contacts with the rear sucker mechanisms, breakage of any part thereof will be precluded by reason of the fact that the entire supporting structure for the rear sucker members is mounted to swing upwardly about the axis of the stub shafts 353 and 354 as hereinbefore noted. This condition is illustrated in Figure 11.

CALIPERS AND TRIPPING MECHANISM (*Figures 2a, 3a, 4, 5, 6, 7, 8, 12, 14, 28, 39, 40 and 41. Sheets Nos. 2, 3, 5, 6, 7, 8, 9, 12, 14, 20, 24 and 25*)

The calipers which have been referred to hereinbefore and which embody the driven caliper rolls 85 are utilized to initiate the functioning of the tripping mechanism by which all feeding action is stopped and the passage of the imperfect or double sheet which operates the calipers down into the press is prevented.

Each caliper roll 85 is slidably keyed to the drive shaft 83 and is held in adjusted position thereon by yokes 365 clamped to the rectangular transverse bar 45, one at each end of the caliper roll. Also adjustably clamped to the rectangular cross bar 45 are brackets 366 having comparatively long overhanging arms 367 whose outermost ends are positioned adjacent the rolls 85. Freely pivotally mounted on the outer ends of the arms 367 are levers 368, carrying contact rolls 369 at their outer free ends to ride on the rolls 85 and hold the sheet in contact therewith as it passes.

The outer end of each arm 367 also has a lever 369 medially pivoted thereon. The outer end of this lever freely rotatably mounts a segment 370, the weight of which is so distributed that it tends to turn in a counterclockwise direction with respect to Figure 12. Such rotation, however, is limited by the engagement of a stop pin 371 carried by the segment, with the lever 369. The other end of the lever 369 is yieldably urged upwardly by a spring 372 into firm engagement with an adjustable stop screw 373 threaded in a lug formed on the outer extremity of the arm 367. By means of the screw 373, the clearance between the peripheral edge of the segment and the caliper roll 85 may be accurately adjusted.

In view of the fact that the sheets fed are often but a few thousandths of an inch thick, this adjustment is very important and must be accurately effected. When properly adjusted, the clearance between the peripheral edge of the segment and the caliper roll is just sufficient to permit a single sheet to pass therebetween so that if two sheets are simultaneously fed or if one sheet has a portion thereof folded so as to be imperfect, the segment 370 will be swung in a clockwise direction with respect to Figure 12 to initiate the functioning of the tripping mechanism which stops the entire feeding action of the feeder.

This clockwise rotation on the part of the segment 370 is transmitted by means of a lever 374 fixed to and depending from a transverse shaft 375, the segment having a cam portion 376 to engage the free end of the lever and effect swinging movement thereof to rock the shaft in a counterclockwise direction as viewed from the feed side of the feeder.

The transverse shaft 375 is journalled in bearings carried by the side frames 40 and 41 and its feed side end projects from the adjacent side frame to mount a bell crank lever 377 (see Figure 4). One arm of the bell crank lever 377 has a hardened steel block 378 fixed thereto, the end of which is stepped to define a sharp shoulder 379, which normally engages a square shouldered stud 380 fixed to the outer end of a lever 381 pivotally mounted on a stub shaft 382 journalled in a bearing in the adjacent side frame.

A tension spring 383, having one end attached to the opposite arm of the bell crank lever 377 and its other end hooked onto the lever 381, yieldably maintains the shoulder 379 of the hardened steel block 378 in operative engagement with the stud 380 and thus holds the lever 381 in its normal inoperative position against the action of a spring 384, tending at all times to swing the lever 381 to the right as viewed from the feed side. The spring 384 has one end attached to a cross pin 385 carried by the lever 381 and has its opposite end anchored to a stationary part of the mechanism.

The outer end of the cross pin 385 bears against the free end of a lever 386 fixed to the stub shaft 382. Engaging the opposite inner end of the cross pin 385 is the free end of a pawl 387 which is loosely pivoted on the stub shaft 382 between the face of the side frame and the lever 381. A light tension spring 388, having one end hooked to the cross pin 385, and its other end anchored to the pawl 387, yieldably maintains the pawl in engagement with the cross pin. The pawl 387 is mounted in the plane of the bell crank lever 119, whose arm 120 is notched to provide a shoulder 389 with which the pawl 387 is engageable.

Upon engagement of the pawl with said shoulder 389, the bell crank lever is held from following its cam and as the motion of the bell crank lever induced by its cam, which it normally follows, produces the motion of the sheet straightening fingers 113, it follows that when the bell crank 119 is restrained against motion, the sheet straighteners will likewise be held stationary and in their upright operative positions.

Engagement of the pawl 398 with the shoulder 389 follows as a result of the release of the lever 381, by the turning of the shaft 375, which as hereinbefore stated, takes place whenever the caliper segment is tripped. Upon such release of the lever 381 by the turning of the shaft 375 and the disengagement of the shoulder 379 from the stud 380, the lever 381 is pulled to its operative position by the spring 384. If, at the moment the bell crank lever 119 is in its forward extremity of motion, the end of the pawl 387 will engage and ride on the rounded end of the bell crank lever arm until the shoulder 389 passes the end of the pawl, whereupon the spring 384 will snap the pawl into operative engagement with the shoulder.

Simultaneously with the engagement of the pawl 387 with the bell crank lever 119, the shaft 382 will be turned through the medium of the lever 386. Rotation of the shaft 382 imparts swinging movement to a lever 390 fixed to the inner end of the shaft. As clearly shown in Figure 7, the lever 390 swings between the tie rod 43 and a transverse shaft 391 journalled in bearings carried by the side frames. A lug 392 is formed on the medial portion of the lever 390 to abut the tie rod 43, and an adjustable stop screw threaded in a stud 393 fixed to the adjacent portion of the lever 390 is arranged to bear against the shaft 391. The tie rod 43 and the shaft 391 thus serve as abutments to limit the possible rocking movement of the lever 390.

The normal position of the lever 390 is as illustrated in Figure 7, with its stop screw 394 abutting the shaft 391. Upon turning movement of the shaft 382 effected by the tripping mechanism as described, the lever 390 is swung to its opposite position engaging its lug 392 with the tie rod 43.

The outer free end of the lever 390 has a stud 395 rotatably mounted thereon, in which a rod 396 is slidably mounted. The lower end of the rod 396 is anchored to a cross shaft 397 journalled in holes formed in the lower forward portions of the side frames 40 and 41. A compression spring 398 is confined between the shaft 397 and a washer 399, engaging the stud 395. The relative location of the centers of the shafts 382 and 397 and the stud 395 with respect to the degree of rocking movement of the lever 390 is such that the center of the stud 395 passes through dead center as the lever 390 is rocked from one position to the other so that the spring 398 yieldably holds the lever 390 and consequently the shaft 397 in either of its positions.

The gear side end of the shaft 397 projects beyond the adjacent side frame to mount a lever 400. The outer free end of this lever 400 is connected by a link 401 with one arm 402 of a bell crank lever 403 freely rotatably mounted on the adjacent outer end of the stub shaft 52. The other arm 404 has a stud 405 fixed thereto, which is slidably received in an elongated slot 406 formed in the lower end of an upright link 407. The upper end of the link 407 is connected by means of a slot 408 in the link, and a stud 409 slidably received therein, to the claw 90.

A tension spring 410 having one end anchored to the stud 212 and its other end attached to the link 407, yieldably maintains the link in its uppermost position permitted by the stud 405. In other words, the spring 410 pulls the link 407 upwardly to normally maintain the lower end of the slot 406 in contact with the stud 405.

In the normal inactive position of the tripping mechanism, the bell crank lever 403 is maintained in its position illustrated in Figure 5, holding the link 407 down, but when the tripping mechanism is actuated through the initiation of the caliper mechanism as hereinbefore described, and the shaft 397 is turned, the bell crank lever 403 will be swung in a clockwise direction about its pivotal mounting as viewed from the gear side of the feeder. This motion of the bell crank lever 403 permits the spring 410 to pull the link 407 upwardly and if the engagement of the claw 90 with the stud 89 on the lever 87 is not under tension, which occurs at the completion of its retraction stroke, then the spring 410 will pull the link 407 upwardly sufficiently far to lift the claw off of the stud 89 and thus disconnect the front sucker actuating shaft 92 from its source of power.

It will be noted that at the time the actuating shaft 92 is disconnected from its source of power, the front suckers are down on the pile to hold the top sheets in place.

In the event the tripping mechanism is actuated while the engagement of the claw 90 with the stud 89 is under tension, then the force of the spring 410 will remain potential until the tension between the claw and the stud 89 is relieved.

The elongated slot 408 in the upper end of the link 407 provides lost motion during the resetting of the mechanism. During this action, it is only necessary to withdraw the link 407 to its position illustrated in Figure 5, as the claw 90 will reengage the stud 89 by gravity, the lost motion afforded by the slot accommodating downward movement of the link 407 in the event the lever 87 is not in line with the notch in the claw.

The oscillation of the shaft 397 in response to the functioning of the tripping mechanism, as hereinbefore noted, renders the valve actuating means inoperative. For this purpose, an arm 420 is fixed to the shaft 397 with its outer laterally directed portion 421 arranged to engage a lifter finger 422 carried by the latch arm 205 of the retainer lever 204.

As the shaft 397 turns in response to the functioning of the tripping mechanism, the outer laterally directed end portion 421 of the lever 420 lifts the finger 422 to its position illustrated in Figure 39 to lift the retainer lever 204 and disengage the latch bar 205 from the stud 206. Upon such disengagement of the latch 205 from the stud 206, the spring 207 pulls the valve rocker arm carrier 198 to its inoperative position depicted in Figure 39, carrying the pivotal axis 199 of the rocker arms away from the cam shaft axis so that the rocker arm cams will have no effect upon the rocker arms and the valves will remain closed.

It is observed that the stud 206 is triangular and that the hook of the latch engages over the stud in such a manner that disengagement cannot be readily effected while the latch is actively holding the rocker arm carrier in its operative position or in other words, is under tension. Detachment of the latch 205 from the stud 206 is possible only when the high point of the cam 97 rides under the roller 208 on the outer end of the carrier lever 198, whereupon the carrier lever is moved a slight distance beyond its position at which it is held by the latch to thus permit disengagement of the latch from the stud.

However, it is probable that the functioning of the tripping mechanism will be initiated by the calipers during the time the engagement of the latch with its keeper stud 206 is under tension, and as the motion of the arm 420 is positive, a yieldable connection must be provided between the retainer lever 204 and the arm 420. This yieldable connection is conveniently afforded by making the finger 422 of flexible though comparatively stiff material and in the present embodiment is illustrated as being in the form of a stiff coiled spring. The flexibility of the finger 422 accommodates the motion of the lifter arm 420 and applies a lifting force on the lever 204, which remains potential until such time when the cam 97 moves the carrier lever arm 198 sufficiently far to release the tension in the engagement of a latch with its keeper stud.

It is noted that during the interruption of the feeding action, the main drive as well as the drive for the pressure and suction pumps, is not disturbed. Consequently, the resumption of the feeding action may be easily effected entirely without picking up any heavy loads as might result from the disengagement and engagement of clutches controlling the driving connection to mechanical mechanism having a high starting torque.

The resetting of all of the entire tripping mechanism is accomplished simply by turning the transverse shaft 397 back to its normal position and for this purpose, an operating bar 424 is provided. This bar is located on the feed side of the feeder and is connected with the shaft 397 by a lever arm 425 fixed to the feed side end of the shaft 397.

In the embodiment illustrated, the bar 424 extends along the feed side of the delivery mechanism, having its outer end slidably supported from the feed board frame as at 426. The operating bar 424 may terminate at the point shown, or it may be continued to be readily accessible from a point adjacent the press proper. Shifting the rod 424 toward the rear of the feeder turns the shaft 397 back to its normal position, where it is held by the spring 398.

Resetting of the valve controlling mechanism follows as a result of the descent of the arm 420, with the resetting movement of the shaft 397, for as the arm 420 moves downwardly, it permits the retainer latch arm 205 to again rest on the keeper stud 206 and as the latch arm 205 is sufficiently long to be above the keeper stud at all times, it follows that at no time will the latch arm drop beneath the keeper stud. Consequently, as the carrier arm 198 is swung to its operative position by the action of its cam 97, the hooked end of the latch arm will drop behind the keeper stud and again secure the carrier arm in its operative position.

Resetting of the connection between the claw 90 and the rock lever 87 has already been described, and follows upon the movement of the link 407 down to its inoperative position through the lever 403 and the link 401.

Resetting of the bell crank lever 381 is effected by the turning of the shaft 382, which, of course is brought about by the resetting rotation of the shaft 397. This resetting motion of the shaft 382 is transmitted to the bell crank lever 381 by the lever arm 386, which, as stated, is fixed to the shaft 382 and has its outer end bearing against the cross pin 385.

As the shaft 382 is turned and the lever arm 386 lifts the lever 381, the square shouldered stud 380 on the outer end of the lever 381, moves away from the axis of the shaft 375 and permits the reengagement of the shoulder 379 with the stud 380. It will be remembered that the shoulder 379 is part of the bell crank lever structure 377 and is fixed to the shaft 375. This shaft, of course, assumes its normal position under the action of the spring 383 as soon as the caliper segments drop back to their normal positions, which occurs as soon as the double sheet or a doubled over part of a single sheet leaves the segments.

Simultaneously with the resetting of the lever 381, there is a tendency to disengage the pawl 387 from the shoulder 389 on the bell crank lever 119, this force tending to disengage the pawl being afforded by the spring 388. However, as the pawl cannot be readily disengaged from the shoulder 389 while the engagement therebetween is under tension, or in other words, while the pawl is actively holding the bell crank lever 119 from following its cam, the spring 388 is placed under tension and affords a potential force to snap the pawl to inoperative disengaged position as soon as the tension is relieved.

This relief of the tension in the engagement between the pawl and the bell crank lever is obtained by the action of the cam 101 as the high point thereof moves the bell crank lever 119 a slight distance beyond the position to which it is held by the pawl.

With the disengagement of the pawl from the bell crank lever 119, the resetting of all of the mechanism is completed and the normal feeding action again takes place.

The feeding action may be manually interrupted by pulling the bar 424 toward the front of the press. Such motion of the bar 424 rocks the shaft 397 to its tripping position and effectually renders all of the feeding mechanism inactive. The only distinction between the functioning of the tripping mechanism when operated manually and when operated in response to the functioning of the caliper mechanism, is that the lever 381 and also the pawl 387 remain in their normal operative positions when the feeding action is manually stopped, for it is unlikely under such conditions that the passage of the last sheet fed is intended to be interrupted.

DELIVERY MECHANISM (Figures 1, 2, 2a, 3, 3a, 4, 5, 15, 16 and 16a. Sheets Nos. 1, 2, 3, 4, 5, 6 and 15)

The delivery mechanism in many respects is of conventional design. As is customary, it receives the sheets picked up and started forward by the feeder proper and carries them to the press or other machine with which the feeder is connected, on the tapes 82, which, as hereinbefore noted, are trained about and driven by the delivery roll 81.

As also hereinbefore noted, the entire delivery mechanism rests on the feed board 5, which is supported in the customary manner at a downward inclination. The delivery mechanism also involves the two customary upper and lower sections designated generally by the numerals 430 and 431 respectively, hingedly connected as at 432.

The upper section 430 includes rack bars 433, having their upper end portions slidably mounted in guideways 434 pivotally mounted on the end portions of the shaft 391. The guideways 434 hold the rack bars in mesh with pinions 435 fixed to the shaft 391 so that upon rotation of the shaft 391, effected by means of a crank or other suitable manually operable member 436 fixed to the shaft at the feed side of the feeder, the rack bars may be moved forward and backward to carry the delivery mechanism toward and away from the feeder proper.

The rack bars form the sole permanent connection with the mechanism head of the feeder and being pivotal about the axis of the shaft 391, it follows that the delivery mechanism may be folded up about the axis of the shaft 391 to move the same entirely out of the way in the event it is desired to use the press without the feeder.

The lower ends of the rack bars 433 are attached to brackets 437 in which the shaft 432, which affords a hinged connection between the upper and lower sections of the delivery mechanism, is fixed. The shaft 432 thus provides a rigid connection between the lower ends of the rack bars and functions therewith to provide a rigid frame for the upper delivery mechanism section.

The brackets 437 also carry bearings (not shown) in which the shaft 114 is journalled. This shaft, as hereinbefore noted, carries the sheet straightening fingers 113 and upon oscillation moves the same to and from a raised operative position in the path of the sheet, as it is carried down into the press upon the tapes (see Figure 15).

The shaft 114 is oscillated, as hereinbefore described, by the motion produced by cam 101 and transmitted to the shaft 114 through the linkage including the medially pivoted lever 117. The medially pivoted lever 117 is conveniently mounted on a shaft 438, carried by the rack bars 433. A compression spring 439 is provided to yieldably urge the lever 117 in a direction tending to lower the sheet straightening fingers. This spring is mounted on a rod 440, having one end connected with the lever 117 and its other end slidably received in a stud 441 fixed to the inner face of the rack bar on the feed side of the mechanism. One end of the spring bears against a stop 442 fixed to the rod 440.

The spring 439 also serves to readily detachably maintain the link 118 connected to the levers 117 and 119. Inasmuch as the delivery mechanism is arranged to be rolled back toward the feeder proper, this link is readily detachably engaged with the two levers it connects. A convenient connection for this purpose is afforded by providing multiple diameter openings 443 in connecting eyes 444 at the ends of the link. The large diameter portion of the openings 443 permits the head of the studs 445 carried by the levers to pass therethrough, and the small diameter portions of the openings are substantially of the same diameter as the bearing portions of the studs.

To disengage the link 118, it is only necessary to move the lever 117 against the action of its spring 439, whereupon both of its connecting eyes may be readily disengaged from their studs 445.

The shaft 114 also carries a pair of roller wheels 446 arranged to rest on the feed board and to movably support the intermediate portion of the delivery mechanism.

The outer section 431 of the delivery mechanism consists of an upper head 447, and a lower head 448. The upper head has two side supporting frames, a feed side frame 449 and a gear side frame 450, both of which are bored to receive the shaft 432. A transverse shaft 451 having its opposite end portions fixed in the side frames 449 and 450 forms a rigid connection therebetween.

The lower head 448 consists of a feed side frame 452 and a gear side frame 453, rigidly connected by tie rods and a rotatable cam shaft 454. Both side frames 452 and 453 have supporting rollers 455 adjustably mounted thereon to support the lower end of the delivery mechanism and to afford adjustment of the height thereof to insure proper delivery of the sheets into the press.

The upper and lower heads are rigidly connected by longitudinal rack bars 456. The rack bars 456 provide a support for the slow down rolls indicated generally by the numeral 457. The driven slow down roll 458 is mounted on a shaft 459 journalled in supporting brackets 460, which are slidable on the rack bars 456. The location of the slow down mechanism is conveniently adjusted by means of pinions 461, fixed to a shaft 462, journalled in a tube 463, which in turn is journalled in suitable bearings carried by the side brackets 460. A crank or other actuating member 464 fastened to the shaft 462 provides means for actuating the pinions and for racking the entire slow down mechanism forward and backward.

Fixed to the tube 463, are arms 466 which carry at their outer ends, contact wheels 467 to be raised and lowered out of and into engagement with the slow down roll 458 upon oscillation of the tube 463.

The slow down roll 458 is oscillated at a uniform speed slower than the lineal speed of the tapes carrying the sheets down into the press.

The drive for the slow down roll 458 as hereinbefore noted, is obtained from the motion produced by the cam 102. The motion of the cam 102 rocks the bell crank lever 123 about its pivotal mounting and the rocking motion thereof is imparted to a gear segment 468 pivotally mounted on a stub shaft 469 carried by the side frame 449 of the upper head.

The link 124, like the link 118, also has connecting eyes 444 for readily detachably connecting the same with the gear sector and the bell crank lever 123, and to maintain the link 124 in tension, a spring 470 is provided. The spring 470 is mounted on a rod 471, one end of which bears against a projection 472 carried by the gear sector and the other end thereof is slidably received in a hole through the adjacent end portion of the shaft 451, the spring 470 being confined between the shaft 451 and a stop carried by the rod 471.

The spring 470 also provides the spring tension to hold the cam follower of the bell crank lever 123 in engagement with the cam 102 and yieldably urges the gear sector 468 in a clockwise direction of rotation as viewed from the feed side.

The oscillation of the gear sector 468 is translated into a reciprocating motion on the part of a sliding rack bar 473. The sliding rack bar meshes with a pinion 474 fixed to the shaft 459, which carries the slow down roll so that as the rack is reciprocated, the slow down roll is oscillated back and forth. The oscillation of the slow down roll continues uninterruptedly and at a speed less than the linear speed of the tapes carrying the sheets down into the press.

At the proper time, the contact wheels 467 descend to hold the sheets onto the slow down roll and thereby slow down their forward travel. The rising and falling of the contact wheels, as hereinbefore noted, is effected by oscillation of the sleeve 463, and this motion is obtained in a manner now about to be described.

Fixed to the sleeve 463 at its feed side end is a lever arm 475. The outer end of this arm mounts a roller 476 which is adapted to track on a parallel bar 477. The upper end of the parallel bar 477 is supported by a lever 478 pivotally mounted on the shaft 451, and the lower end of the parallel bar is carried by a lever 479 pivotally mounted as at 480 from the adjacent side frame 452.

The lever 479 also mounts a roller 481 which tracks on a cam 482 fixed to the cam shaft 454. The action of the cam 482 imparts a swinging oscillatory motion to the parallel bar 477 to raise and lower the lever arm 475 and impart oscillation to the sleeve or tube 463.

The roller 476 carried by the arm is caused to follow the parallel bar at all times by a compression spring 483 mounted on a rod 484 whose outer end is slidable in a bracket 485, fixed to a tie rod 486, connecting the brackets 460. The opposite end of the rod bears against an abutment 487 formed as part of the lever 475 and the spring is confined between a stop fixed to the rod adjacent said abutment and the bracket part in which the rod is slidable. Obviously, as the parallel bar 477 drops down in following its cam 482, the sleeve 463 will be turned to lower the contact wheels 467 onto the slow down roll.

The cam shaft 454 driven from the drive shaft 75 on the gear side of the feeder. The driving connection consists of a bevel gear 488 fixed to the shaft 454 and meshing with a bevel pinion 489 fixed to the lower end of a drive shaft extension 490. The drive shaft extension 490 is journalled in bearings 491 and 492 carried respectively by the lower and upper heads of the lower delivery mechanism section, and its upper end is connected through a universal joint 493 with the shaft 75. The joint 493 is preferably readily disengageable to allow the lower section to be swung up on its hinged mounting 432.

In view of the comparatively long line of motion transmitting elements between the main drive from which the shaft 75 is driven and the cam controlling the rising and falling of the parallel bar, considerable back-lash may be present so that the timing of the rising and falling of the parallel bar cannot be accurately obtained merely from this driving arrangement. It is also difficult with this construction to obtain properly timed coordination between the operation of the slow down rolls and the sheet straightener.

This difficulty is entirely overcome in the present invention by providing a control for the descent of the parallel bar and consequently the contact wheels, which is responsive to and at all times in step with the actuating mechanism for the sheet straightener. This control consists of a releasable latch finger 494 carried by a lever 495 pivotally mounted as at 496 on the side frame 449. The end of the latch finger 494 is stepped to provide a sharp, well defined, shoulder engageable with a keeper stud 497 fixed to the lever 478. The relationship of the latch finger and the keeper stud 497 with respect to the lever 478, is such that when the latch finger is engaged with the keeper stud, the lever 478 will be held in its raised position, against the action of the spring 483. Thus regardless of whether or not the high point of the cam has left the cam follower roller 481, the parallel bar will be held up until the latch finger is disengaged from the keeper stud 497.

The disengagement of the latch finger 494 from the keeper stud is effected by the engagement of the spring rod 471 with an adjustable stop screw 498 secured in the outer end of the lever 495. A light spring 499 holds the lever 495 in its latching position. By adjusting the clearance between the ends of the screw 498 and the rod 471, when the rod is in its lowermost position, the time at which the latch finger releases the parallel bar for its descent may be very closely adjusted. Also, the time of release is directly in step with the functioning of the sheet straightener as the rod 471 reciprocates in unison with the motion of the sheet straightening fingers.

In this manner, absolute coordination between the sheet straighteners and the functioning of the slow down rolls is obtained and a degree of accuracy heretofore not possible is afforded.

Obviously, after the parallel bar has been released, and has descended to permit the contact wheels to drop onto the slow down roll, the return elevation of the bar and the consequent motion of the lever 478 reengages the latch 494 with its keeper stud 497.

At its gear side end, the cam shaft 454 has a cam 500 fixed thereto. This cam actuates a lever 501 pivotally mounted as at 502 to impart oscillation to a shaft 503 through a link 504 and a lever 505 fixed to the shaft 503. Secured to the shaft 503 are arms 506 which carry at their outer extremities a tape elevator 507. The tape elevator extends transversely across the medial portion of the delivery mechanism above the hinged connection of its upper and lower sections and forms the point of intersection of the two planes in which the upper stretch of tapes travels, the tapes engaging directly on the tape elevator 507.

The action of the cam 500, controlling the rising and falling of the tape elevator is so coordinated with the rest of the mechanism that the tapes are lowered after the sheet has reached the guides on the press and remain down until the press grippers pick up the sheet. As is customary, the elevator 507 descends sufficiently far to allow the tapes to drop beneath the level of the carrying sticks (not shown) but with which the delivery mechanism is equipped so that during the time the sheet is being picked up by the press grippers it is freed from driving force.

The distance the tape elevator 507 descends in response to the lever 501, following the low portion of the cam 500 is accurately adjusted by means of an adjusting screw 508. The adjusting screw 508 is carried at the outer end of a lever 509 fixed to the shaft 503 at its feed side end, to abut the side frame 449 at the downward limit of the tape elevator 507.

Besides the customary carrying sticks which, for the sake of clearness, have been omitted from the drawings, the delivery mechanism also incorporates the usual guards and guides to insure proper travel of the sheet. All of these elements, however, are of conventional design and form no part of the invention. Consequently, they have not been shown.

OPERATION

Assuming that the pile of sheets has been properly elevated and the feeder and the press with which it is connected are ready to be run. The press is started and as the feeder is driven from the press, its main drive becomes operative. If desired, a clutch may be provided between the press and the feeder main drive to allow independent operation of the press.

Although the main drive of the feeder is in operation, there is no feeding action as the pumps are driven by their own motor 170. After the pump motor is started and the pumps are in operation, the feeding action will commence if the tripping mechanism is in its running condition, this being controlled by the manually shiftable bar at the feed side of the feeder.

The cycle of operation is as follows: First, the sheet is separated from the top of the pile. This is done by the combing wheels adjacent the rear suckers working in conjunction with the air blower nozzles which serve as presser feet to hold the top of the pile down at a short distance from the combing wheels. The rotation of the combing wheels buckles the topmost sheets between the combing wheels and the air blower nozzles and thus effectually separates the same. With the sheets buckled in this manner, the rear suckers descend and grip the topmost sheet.

Immediately thereafter, the combing wheels are lifted from the pile and the air blower nozzles are swung upwardly and rearwardly and then descend back onto the pile under the topmost sheet. In this clamping position they deliver blasts of air under the topmost sheet to float the same on a cushion of air.

The front suckers then descend and pick up the front edge of the sheet, this action being made possible by reason of the fact that the top sheet is floated on air. If the blasts of air issuing from the rear suckers are insufficient to obtain the desired floating effect, additional side blowers may be provided. As the front suckers lift the edge of the sheet, their rocking motion commences to forward the sheet onto the tapes of the delivery mechanism above the delivery roll 81. Simultaneously with the initiation of the forwarding motion of the front suckers, the rear suckers let go of the sheet by reason of the fact that the suction thereto is shut off.

As the sheet is placed above the delivery roll 81, the contact rolls working in conjunction therewith descend and hold the sheet in contact with the tapes travelling over the roll 81 so that the sheet is positively forwarded down into the delivery mechanism.

As the sheet commences its forward travel, it passes through the calipering mechanism and if the sheet has not been mutilated, folded or otherwise damaged, and if it is not a double sheet, it continues its forward travel through the delivery mechanism without effect on the calipers. Substantially half way down the delivery mechanism, the sheet straightening fingers 113 come up into the path of the sheet and momentarily engage the forward edge of the sheet to retard its advance and thereby straighten the sheet.

Just before the sheet reaches the press the slow down mechanism functions to retard its final delivery to insure proper approach to the press.

In the event a double sheet is forwarded or the sheet is mutilated, resulting in a thickness greater than that of a single sheet, the calipers are actuated to initiate the functioning of the tripping mechanism which stops all feeding action. It is particularly observed that in the event the tripping mechanism is actuated by the calipers, the sheet or sheets which actuated the calipers are prevented from passing down into the press and are held against movement into the press by the sheet straightening fingers remaining in their active positions. Utilizing the straightening fingers for this function, thus obviates the heretofore necessary provision of additional sheet arresting means.

As the operation of the press continues, and the sheets are removed from the top of the pile, the automatic pile elevator functions to maintain the top of the pile substantially at a predetermined level.

METHOD OF ERECTION

The construction of the feeder and particularly the mechanism head and its support facilitates the erection of the feeder. This feature of the feeder is particularly desirable especially where the feeder is designed to handle comparatively large sheets for in such structures, the operating parts, which must be mounted at the top of the supporting structure are quite heavy.

In the present structure, the mechanism head may be completely assembled by the manufacturer, and then shipped out and raised into position entirely without the aid of hoists and with a minimum of help and labor.

Figure 37:
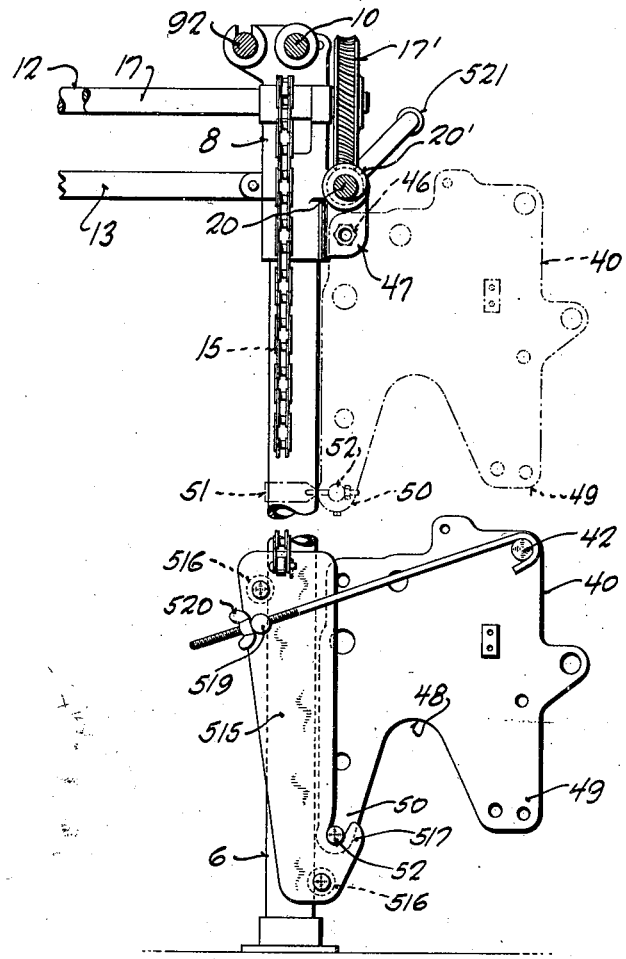
Figure 37 is a view showing part of the supporting structure and illustrating the manner of raising the mechanism head.

The method of raising the mechanism head to its proper position at the top of the front columns is illustrated in Figure 37. As here shown, the general supporting frame comprising the columns and the connecting members at the upper ends thereof, has been set up and likewise the pile elevating chains and the sprocket shafts with the sprockets over which they are trained, are in position.

Attached to the lower ends of the front chains are carrier brackets 515. These brackets have rollers 516 to engage the front and rear faces of the columns and slidably mount the carriers for vertical movement. The lower ends of the carriers are provided with hooks 517 adapted to engage the stub shafts 52 on the mechanism head and thus support the entire head. To hold the head on the carrier brackets, retaining hooks are provided, the hooked ends thereof engaging over the tie rod 45. The opposite ends of the retaining hooks are slidably received in studs 519 fixed to the carrier brackets and are threaded to receive wing nuts 520 by which the angular position of the head with respect to the columns is readily adjustable.

With the carrier brackets lowered, the mechanism head may be readily mounted thereon as to do so requires very little, if any, lifting. The mechanism head having been properly mounted on the carrier brackets, the worm shaft 20 is manually actuated by means of a crank 521 temporarily attached thereto until the mechanism head has been elevated to its proper position, whereupon the supporting bolts 46 are inserted to suspend the mechanism head in its operative position.

Figure 38:
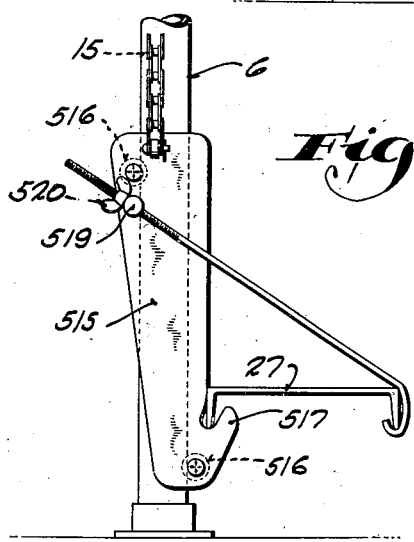
Figure 38 illustrates the manner of raising the pump supporting shelf.

The same carrier brackets 515 are also used to raise the pump supporting shelf 27 with the pumps and associated apparatus mounted thereon to its proper position as shown in Figure 38.

MODIFIED SHEET FORWARDING MECHANISM

*(Figure 42, Sheet 24)*

In some instances, it may be desirable to omit the front suckers and assign the forwarding function thereof to the rear suckers. In other words, the separation of the sheets and the feeding thereof into the delivery mechanism can be effected entirely at the rear of the pile, and in Figure 42, a modified embodiment of the rear suckers is illustrated to obtain this desired action. As here shown, the sucker tube 525 is pivotally supported from the outer end of an arm 526, by means of a clamp 527 and a pivot pin 528.

The opposite end of the arm 526 is pivotally attached to a lever 529 pivotal about a fixed shaft 530. The opposite end of the lever 529 has a roller 531 to track on a cam 532 carried by a cam shaft 533. As the cam rotates, the lever 529 is rocked about its pivotal support, to reciprocate the arm 526, a spring 534 being provided to insure the tracking of the follower 531 on the cam 532.

The pivot pin 528 besides pivotally mounting the tube 525 on the outer end of the arm 526, also slidably engages in an elongated slot 535 in the outer end of an arm 536, pivotally mounted at its opposite end as at 537.

At a medial point, the arm 536 carries a roller 538, which tracks on a cam 539 also carried by the shaft 533, to raise and lower the outer end of the arm and consequently the sucker tube. Through the combined action of the cams 532 and 539, and the levers and arms actuated thereby, the sucker is given an oscillating action, first, descending down onto the pile, then raising a slight distance upwardly, and then moving forwardly toward the delivery mechanism.

The functioning of the sucker is, of course, coordinated with the combing wheels, and air blowing nozzles so that as the forwarding motion of the suckers is commenced, the sheet is floated on air and is thereby readily conveyed onto the delivery roll 81, being guided in its forward motion by guide fingers 540.

From the foregoing description, taken in connection with the accompanying drawings, it will be readily apparent to those skilled in the art, that this invention affords numerous improvements in suction sheet feeders which collectively afford greater accuracy at high speeds and greater convenience of operation.

What we claim as our invention is:

1. In a sheet feeding device, the combination with a support for a pile of sheets and mechanism to carry the sheets to a predetermined destination, suction means to forward the sheets singly from the pile to said mechanism comprising a sheet engaging suction member, an oscillatory shaft, means on said shaft to mount the suction member for movement into engagement with the topmost sheet of the pile and for swinging movement about the axis of said shaft and toward said mechanism, and means operable by oscillation of the shaft to effect the sheet engaging and swinging motions of the suction member.

2. In a sheet feeding device, a sheet forwarder comprising a suction member adapted to engage and grip the topmost sheet of a pile, an oscillatory shaft, supporting means for the suction member mounted on the oscillatory shaft, and means actuated by oscillation of said shaft to move the suction member into sheet engaging position and to swing the same in an arc to carry the sheet from the pile.

3. In a sheet feeding device, a sheet forwarder comprising, a suction cup adapted to engage and grip the topmost sheet of a pile, a swinging support for the suction cup adapted to swing the same in an arc away from the pile, and yieldable means to engage the suction cup with the topmost sheet of the pile and means restraining the yieldable means from actuating the suction cup except when the suction cup is at substantially its limit of its swinging motion above the pile.

4. In a sheet feeding device, a sheet forwarder comprising a collapsible chamber, a suction cup carried by the chamber and communicated with the interior thereof, yieldable means to expand the chamber and thereby lower the suction cup into sheet engaging position, and power driven mechanical means to alternately collapse the chamber and allow the expansion thereof by said yieldable means, whereby the suction cup is positively moved to and from its sheet engaging position, said chamber also being collapsible by the effect of vacuum therein upon the sealing of the suction cup by a sheet, whereby the suction cup and the sheet gripped thereby are automatically elevated.

5. In a sheet feeding device, a support for a pile of sheets, a suction member movable up and down into and out of engagement with the top of a pile of sheets on said support and movable laterally to carry a sheet gripped thereby from the pile, means to provide suction for said member, actuating means to impart the required motion to said member, and means to simultaneously cut off the suction from said member and stop the actuating means in a position holding the suction member down on top of the pile of sheets.

6. In a sheet feeding device, means to successively remove the top sheet from a pile, said means comprising a suction cup, mechanism to effect engagement of the suction cup with the topmost sheet and to swing the suction cup away from the pile, a drive for said mechanism comprising a continuously operating driver, a releasable connection between the driver and said mechanism, means to release said connection, and yieldable means to move and hold the suction cup down on the top of the pile upon release of said connection.

7. In a sheet feeding device, sheet separating means comprising a combing member to buckle the topmost sheets of a pile and a suction member to engage and grip the buckled portion of the top sheet, means operable to hold the combing member off of the pile, sheet forwarding means including a suction member adapted to pick up the top sheet and move the same from the pile, means to create suction at said sheet separating and sheet forwarding means, a drive for the sheet forwarding means, and single means to disconnect the sheet forwarding means from its drive, to cut off the suction from the sheet forwarding and sheet separating means, and to effect actuation of the holding means to its operative position.

8. In a sheet feeding device, a combing member operable on the topmost sheets of a pile to separate the same, and means pneumatically retained inactive and operable to prevent the engagement of said combing member with the pile.

9. In a sheet feeding device, a sheet separator comprising a combing member engageable with the top of a pile of sheets to buckle the topmost sheets, a suction member to engage the crest of the buckle and grip the topmost sheet, means to provide suction for said suction member, and means to secure the combing member out of engagement with the pile, said securing means being held inoperative by suction at the suction member, and means to render the securing means operative upon cessation of suction at said suction member.

10. In a sheet feeding device, a sheet separator comprising, a combing member to engage the top of a pile of sheets and buckle the topmost sheet, a suction member having a sheet gripping suction cup engageable with the buckled portion of the top sheet, means to provide suction for said suction member, means to cut off the suction from said suction member, and means normally held inactive by the effect of suction at said suction means and operable upon cutting off of the suction to hold the combing member out of contact with the pile.

11. In a sheet feeding device, a sheet separator comprising, means to act on the top of a pile of sheets to cause the topmost sheets to buckle, suction means to engage the buckled portion of the top sheet and lift the same from the pile, an air line to communicate the suction means with a source of suction, means to hold said first mentioned means out of contact with the pile, said holding means being biased to its operative position but normally held in its inoperative position by the effect of suction within said air line, and means to cut off the air line from the source of suction to simultaneously release the holding member for movement to its operative position and stop the functioning of the suction means.

12. In a sheet feeding device, a combing wheel movable up and down to be intermittently engageable with the top of a pile of sheets to buckle the topmost sheets, mechanically driven means to intermittently elevate the combing wheel, and means yieldingly urged to an operative position preventing descent of the combing wheel and pneumatically held in an inoperative position.

13. In a sheet feeding device, a combing wheel movable up and down to be intermittently engageable with the top of a pile of sheets to buckle the topmost sheets, a suction member to engage the buckled portion of the top sheet, an air line communicating the suction member with a source of suction, an air chamber communicated with the air line, a movable member operable to hold the combing wheel elevated, said movable member being biased to its operative position and forming a part of one of the walls defining the air chamber to be responsive to the effect of vacuum in said air chamber and to be held thereby in its inoperative position.

14. In a sheet feeding device, a combing wheel engageable with the top of a pile of sheets to buckle the topmost sheets, a vertically swinging supporting arm for the combing wheel, a rotating cam, means operable by said cam to intermittently lift the supporting arm to elevate the combing wheel out of contact with the pile, and a stop member to hold the supporting arm in a raised position with the combing wheel out of contact with the pile.

15. In a sheet feeding device, a combing wheel mounted for up and down movement out of and into engagement with the top of a pile of sheets, means to intermittently lift the combing wheel including a rotating cam and a pivoted lever adapted to be raised and lowered by the cam, and means to lock the combing wheel in an inoperative raised position comprising a blocking member movable into the path of an abutment carried by said pivoted lever when said lever is in a raised position.

16. In a sheet feeding device, a combing wheel mounted for up and down movement out of and into engagement with the top of a pile of sheets, means to intermittently lift the combing wheel including a rotating cam and a pivoted lever adapted to be raised and lowered by the cam, means to lock the combing wheel in an inoperative raised position comprising a blocking member movable into the path of an abutment carried by said pivoted lever when said lever is in a raised position, and pneumatic means to control the position of said blocking member.

17. In a sheet feeder, a combing wheel, means to elevate the combing wheel to an inoperative position including a pivoted lever arm, an air chamber mounted adjacent the pivoted lever arm, a movable member associated with one wall of the air chamber and operable to engage an abutment carried by the pivoted lever arm to prevent its descent and to thereby hold the combing wheel in its raised inoperative position, and means to control the pressure of the air within the air chamber to govern the position of said blocking member.

18. In a sheet feeder, a combing wheel mounted for up and down movement, means to lift the combing wheel to inoperative position including a rotating cam and a pivoted lever arm, and means to hold the combing wheel in its raised inoperative position comprising, an air chamber, a piston having a part engageable with an abutment carried by the pivoted lever arm and mounted in a cylinder communicated with the air chamber, yieldable means normally urging the piston outwardly from the air chamber to its operative position, and means to create a sufficiently efficient state of vacuum in said air chamber to draw the piston inwardly in opposition to said yieldable means to an inoperative position allowing undisturbed rising and falling of the lever arm and consequently the combing wheel.

19. In a sheet feeder, means to buckle the topmost sheets of a pile, a suction member engageable with the buckled portion of the top sheet, means to mount said suction member for down and up movement to engage the suction member with the top sheet and lift the same, said means including a pivoted lever arm, a rotating cam operable to intermittently lift said lever arm, yieldable means to cause the lever arm to follow the cam and thereby lower the suction member, and means to limit the distance the lever arm is allowed to follow the low portion of the cam to adjust the low position of the suction member.

20. In a sheet feeder, a suction cup mounted for up and down motion, a cam, a cam follower positively lifted by the cam, yieldable means to cause the cam follower to descend with the passage of the low portion of the cam, a connection between the cam follower and the suction cup whereby the suction cup rises and falls with the cam follower, and an adjustable stop to limit the descent of the cam follower and consequently the suction cup.

21. In a suction sheet feeder, a suction member, means to move the suction member down and up into and out of engagement with the top of a pile of sheets, and means operable while the suction member is in motion to accurately adjust the distance it descends.

22. In a suction sheet feeder, a suction member, means to mount the suction member for up and down movement including a lever arm, and a fixed pivotal support for the lever arm, means to effect up and down movement of the lever arm, and cooperating abutments carried by the lever arm and said fixed support to limit downward movement of the lever arm and the suction member, one of said abutments being readily adjustable while the lever arm is in motion whereby the descent of the suction member is accurately adjustable without interrupting its up and down motion.

23. In a suction sheet feeder, a suction member, means to mount the suction member for up and down movement including a lever arm and a fixed pivotal support for the lever arm, means to impart up and down motion to the lever arm, and cooperating abutments carried by the lever arm and said fixed support to limit downward motion of the lever arm and the suction member, one of said abutments being an adjusting screw movable toward and away from the other abutment upon rotation thereof, said screw being readily accessible and adjustable while the lever arm is in motion so that the descent of the suction member may be accurately set without interrupting its up and down motion.

24. In a suction sheet feeder, a suction member, means to mount the suction member for up and down movement including a lever arm and a shaft on which the lever arm is pivotally mounted, means to impart up and down movement to the lever arm, and means to limit the downward movement of the lever arm and consequently the suction member comprising, an adjusting screw threaded in a part carried by said shaft, and an abutment carried by the lever arm and engageable with the end of the adjusting screw.

25. In a suction sheet feeder, a sheet separating mechanism comprising, spaced supporting walls, tie rods to rigidly connect the supporting walls, a drive shaft along which the connected side walls are movable, a combing wheel, a suction member, an air nozzle, levers pivotally mounted on one of said tie rods and associated with said combing wheel, suction member, and air nozzle to effect predetermined motion thereof, cams slidably splined to said drive shaft and disposed between the rigidly connected supporting walls to actuate said levers, and a driving connection between the combing wheel and said drive shaft.

26. In a sheet feeding device, the combination with a pile support and means to elevate the support to raise a pile of sheets thereon, a pair of spaced supporting bars arranged at opposite sides of and above the pile support, supporting brackets slidably mounted on said spaced supporting bars, a transverse supporting structure hingedly mounted from said brackets, and a sheet separator mechanism adjustably carried by said transverse supporting structure, said separator mechanism including elements operable on the top of the pile, the hinged mounting for said transverse supporting structure allowing a degree of upward movement of the separating mechanism with the pile in the event of excessive elevation to preclude damage to the pile engaging elements.

27. In a suction sheet feeder, a sheet forwarder comprising, a suction member adapted to grip a sheet, an oscillatory shaft, a carrier for the suction member rotatable about the shaft, means to movably mount the suction member with respect to its carrier, and a lever fixed to the oscillatory shaft and operable to effect motion of the suction member with respect to its carrier and engaged with the carrier during a portion of its oscillation to swing the carrier and consequently the suction member about the axis of the shaft.

28. In a suction sheet feeder, a sheet forwarder including a suction cup mounted on the end of a tube, means to mount and actuate the tube for up and down and swinging motion comprising, an oscillatory shaft, a carrier freely rotatable on the shaft, means to support the tube from the carrier for movement along the axis of the tube, and a lever member fixed to the oscillatory shaft to have a predetermined range of oscillation with the shaft, and means operable upon oscillation of the lever member to lower and raise the tube and to swing the carrier about the axis of the shaft.

29. In a suction sheet feeder, a swinging sheet forwarder including a suction member having a suction mouth to grip a sheet, and means to mount and swing the suction member forwardly comprising an oscillatory shaft, a carrier for the suction member freely rotatable on the shaft, a fixed abutment with which the carrier is engageable to define one limit of the swinging movement of the suction member, spring means to yieldably urge the carrier to said limit of swinging movement, a lever fixed to the shaft and adapted to abut the carrier and swing the same in the other direction against the action of its spring means during a portion of the oscillation of the shaft, and means operable by the lever to move the suction member with respect to the carrier for the purpose of engaging the suction mouth with a sheet.

30. In a suction sheet feeder, a sheet forwarder including a suction cup to grip a sheet, means to mount and actuate the suction cup in an up and down and swinging motion comprising an oscillatory shaft, a lever member slidably splined to the shaft, said lever member having an extended hub, a carrier freely rotatably mounted on the hub, means to mount the suction cup from the carrier for up and down movement with respect to the carrier, a fixed abutment adjacent the shaft and with which part of the carrier engages to define one limit of the swinging movement of the suction cup, yieldable means tending to swing the carrier about the axis of the shaft into engagement with said fixed abutment, a lever pivotally mounted on the carrier and connected with the suction cup to impart up and down movement to the suction cup, a connection between said lever and the lever member which is splined to the shaft whereby oscillation of the shaft effects up and down movement of the suction cup, and means carried by the lever member splined to the shaft and engageable with the carrier during a portion of its oscillation with the shaft to swing the carrier and consequently the suction cup in an arc.

31. In a sheet feeding device, the combination with a delivery mechanism to convey sheets to a predetermined destination, and a sheet forwarding mechanism to deposit sheets on the delivery mechanism, sheet straightening means intermittently movable into the path of sheets carried by the delivery mechanism to momentarily engage and retard the advance of the sheets, means to intermittently move the sheet straightening means to its operative position, and means operable to secure the sheet straightening means in its operative position upon the forwarding of an imperfect sheet or a sheet of excessive thickness into the delivery mechanism.

32. In a sheet feeding device adapted to successively convey sheets along a predetermined path, sheet straightening means intermittently movable into the path of the sheets to momentarily engage and retard their forward travel and thereby straighten the same, and means to secure the sheet straightening means in its operative position to stop entirely further passage of sheets.

33. In a sheet feeding device, means to convey sheets successively along a predetermined path, calipering mechanism through which the sheets pass as they are conveyed along said path, sheet straightening means movable into the path of sheets conveyed to momentarily engage and straighten the same, means to yieldably hold the sheet straightening means out of operative position, drive means to intermittently move the sheet straightening means into operative position, and means operable by the calipering mechanism to disengage the sheet straightening means from its drive when the straightening means is operative and engageable with the sheets to secure the same in said operative position to stop and hold the sheet or sheets which initiated the functioning of the calipering mechanism.

34. In a sheet feeding device, means to convey sheets along a predetermined path, calipering mechanism through which the sheets pass as they move along said path, a sheet straightener mounted to move into and out of the path of the sheets to momentarily retard and straighten the sheets, means to yieldably move the sheet straightener to its inoperative position permitting the sheet to continue its passage along said path, drive means to move the sheet straightener to its operative position including a cam and a cam follower, and means operable by the functioning of the calipering mechanism to hold the cam follower against following the cam in its position holding the sheet straightener in its operative position to stop the sheet or sheets which initiated the functioning of the calipering mechanism.

35. In a suction sheet feeder, a sheet forwarder including a suction cup to grip a sheet, a driver to impart forwarding motion to said forwarder, a releasable connection between the forwarder and said driver, a source of suction communicated with the suction cup of the forwarder, a valve to control communication of the suction cup with the source of suction, means to intermittently open the valve and communicate the suction cup with the source of suction, and means to simultaneously stop the motion of the forwarding means and cut off suction from the suction cup comprising, a rock shaft, means operable by turning of the rock shaft to render the valve opening means inoperative, means operable by the same turning of the rock shaft to disconnect the driver from the forwarding means, and means to turn said rock shaft.

36. In a sheet feeder, a sheet forwarder including a suction cup, and means to mount the suction cup for movement into and out of engagement with the top of a pile of sheets and for swinging movement, an oscillatory shaft to mount and move said forwarder, a cam actuated rocking lever, a releasable connection between the oscillatory shaft and the cam actuated rocking lever, and means to release said connection so that all motion of the forwarder may be stopped without interrupting the functioning of the cam actuated rocking lever.

37. In a sheet feeder, a sheet forwarder including a suction cup to grip a sheet, an oscillatory shaft, means to mount the forwarder from the oscillatory shaft and to translate the oscillation of the shaft into the required motion of the forwarder, a cam actuated rocking lever, a claw eccentrically connected to the oscillatory shaft and releasably connected with the rocking lever to oscillate the shaft upon rocking of the lever, and means to disengage the claw from the rocking lever so that all motion of the forwarder may be stopped without interrupting the actuation of the rocking lever.

38. In a sheet feeder, a sheet forwarder including a suction cup to grip a sheet, an oscillatory shaft, means to mount the forwarder from the oscillatory shaft and to translate the oscillation of the shaft into the required motion of the forwarder, a cam actuated rocking lever, a claw eccentrically connected to the oscillatory shaft and releasably connected with the rocking lever to oscillate the shaft upon rocking of the lever, and means to disengage the claw from the rocking lever so that all motion of the forwarder may be stopped without interrupting the actuation of the rocking lever, said last named means comprising a member having a limited sliding connection with the claw and operable upon movement in one direction beyond one limit of its permitted sliding motion to disengage the claw from the rocking lever, a spring to move the member in said direction, and means to oppose the action of the spring, said last named means being movable to free the member for movement by the spring.

39. In a suction sheet feeder, air valves biased to closed position, means to intermittently open the valves comprising rocker arms engageable with the valves, cams to actuate the rocker arms, a movable support on which the rocker arms are pivotally mounted, yieldable means tending to move the support to a position at which the rocker arms are ineffective to open the valves, a latch to releasably hold the support in its operative position, and means to release said latch.

40. In a suction sheet feeder, air valves biased to closed position, rocker arms to open the valves, a movable support on which the rocker arms are pivotally mounted, cams to actuate the rocker arms, a releasable latch to hold the support in an operative position, said support being movable out of operative position upon release of the latch to render the rocker arms ineffective to open the valves, means to release the latch, and means to automatically reengage the latch.

41. In a suction sheet feeder, air valves biased to closed position, cam actuated rocker arms to open the valves, a movable member on which the rocker arms are pivotally mounted, said member being movable to a position at which the rocker arms are ineffective to open the valves, cooperating elements carried by the movable member and a fixed support and releasably engageable to hold the member in its operative position, a tripping arm to disengage the cooperating elements and hold the same disengaged, and cam actuated means to reengage said elements upon return of the tripping arm to its inactive position.

42. In a suction sheet feeder, air valves biased to closed position, rocker arms to open the valves, cams to actuate the rocker arms, a pivoted member to carry the rocker arms, a latch member engageable with the pivoted member to hold the same in its operative position, means to move said pivoted member to a position at which the rocker arms are ineffective to open the valves upon disengagement of the latch member from the pivoted member, a yieldable element engageable with the latch member to immediately disengage the latch member from the pivoted member if the connection between the latch member and the pivoted member is not under tension and to store up energy within itself for disengaging the latch member from the pivoted member in the event the connection is under tension, and a cam operable on the pivoted member to relieve the tension of said connection and enable disengagement of the latch member from the pivoted member and to actively reengage the latch member with the pivoted member upon return of the yieldable element to its inactive position.

43. In a sheet feeder, the combination with a delivery mechanism having means to convey sheets to a predetermined destination, of slow down mechanism independent of the means for conveying the sheets and operable to retard the speed of the sheets as they approach said destination, said slow down means including a driven roll over which the sheets are carried by the conveying means, means to hold the sheets in contact with the roll, and oscillatory means to drive the driven roll.

44. In a sheet feeder, a delivery mechanism having sheet conveying means, forwarding mechanism to remove sheets from a pile and forward them to the delivery mechanism, drive means for the forwarding mechanism including a continuously rotating cam shaft, slow down means for the delivery mechanism independent of its sheet conveying means and including a driven roll over which the sheets are carried by the sheet conveying means, said driven roll having a peripheral speed less than the speed of the conveying means and the sheets carried thereby as they reach the roll, means to hold the sheets in contact with the roll and slow down their speed of travel notwithstanding the tendency of the conveying means to carry them forward at a higher speed, and means to drive the roll comprising, a cam on said cam shaft, and motion transmitting elements operable by said cam and connected with the driven roll.

45. In a sheet feeder, a delivery mechanism having means for conveying a sheet along a defined path, a driven slow down roll over which sheets moving along said path are conveyed, a drop roll to hold the sheets in engagement with the slow down roll, power driven means to raise the drop roll, a releasable latch to hold the drop roll raised until a sheet is brought forward by the conveying means and carried over the slow down roll, and means accurately timed with the passage of a sheet over the slow down roll for releasing the latch to allow descent of the drop roll onto the sheet passing over the slow down roll and thus accurately determine the time of functioning of the slow down means with respect to the passage of the sheet along the delivery mechanism.

46. In a sheet feeder, a delivery mechanism including a sheet straightener, a slow down roll and a drop roll to hold a sheet down on the slow down roll, means to actuate the sheet straightener, means to drive the slow down roll, power driven means to lift the drop roll, a latch to hold the drop roll raised, and means operable by the drive means for the sheet straightener for releasing said latch to enable descent of the drop roll onto a sheet passing over the slow down roll, whereby the functioning of the slow down is accurately timed with the sheet straightener and consequently the travel of the sheet.

47. In a sheet feeder, a delivery mechanism including a sheet straightener to momentarily retard the passage of sheets, a driven slow down roll over which the sheets pass after being released by the sheet straightener, and a drop roll to hold the sheets in contact with the slow down roll, a continuously driven cam shaft, cams on said shaft, means operable by one of the cams to actuate the sheet straightener, means operable by another of said cams to drive the slow down roll, power means to raise the drop roll, a latch to hold the drop roll raised, and means actuated by the drive for the slow down roll to release the latch and allow descent of the drop roll, whereby the functioning of the slow down is accurately timed with the action of the sheet straightener and the drive for the slow down roll.

48. In a sheet feeding device, a delivery mechanism including a driven roll and tapes trained thereover to carry sheets through the delivery mechanism, a drop roll arranged to hold sheets in contact with the delivery roll to start the same through the delivery mechanism, a sheet straightener to momentarily retard the travel of the sheets through the delivery mechanism and straighten the same, a slow down roll over which the sheets pass after they leave the sheet straightener, and a drop roll to hold the sheets in contact with the slow down roll to retard the speed of the final delivery of the sheets, a driven cam shaft, a plurality of cams on said shaft, means operable by one of the cams to raise and lower the first mentioned drop roll which coacts with the delivery roll, means operable by another of said cams to actuate the sheet straightener, means operable by another of said cams to drive the slow down roll, power means to raise the second mentioned drop roll which coacts with the slow down roll, a latch to hold said second mentioned drop roll elevated, and means operable by the drive for the slow down roll to release the latch, whereby the starting of the sheet, the functioning of the sheet straightener, the drive for the slow down roll, and the functioning of the slow down in response to the descent of its drop roll are all accurately timed by said cam shaft.

49. In a sheet feeder including a delivery mechanism having a driven slow down roll and a drop roll to coact therewith, means to elevate the drop roll, a latch to hold the drop roll elevated, means to release the latch and permit descent of the drop roll into operative engagement with the slow down roll, and a readily adjustable member forming part of the releasing means and adjustable to accurately determine the time of release of said latch and consequently the descent of the drop roll.

50. In a sheet feeder, a delivery mechanism including a slow down roll, means to oscillate the slow down roll, a drop roll arranged to hold a sheet in contact with the slow down roll, means to raise the drop roll, a latch to hold the drop roll raised, means movable with the drive for the slow down roll to abut a part rigidly connected with the latch to release the latch, and said part being readily adjustable with respect to said movable means to afford an accurate adjustment for the time of the release of said latch with respect to the action of the slow down roll.

51. In a sheet feeder, a delivery mechanism including a slow down roll, means to oscillate the slow down roll, a drop roll to hold a sheet in contact with the slow down roll, means to raise the drop roll, a latch to hold the drop roll raised, said latch including a pivoted arm, a push rod actuated by the means for oscillating the slow down roll, and an adjusting screw carried by the pivoted lever and with which said push rod is engageable to release the latch, adjustment of the screw setting its position with respect to the push rod and determining the time of functioning of the slow down with respect to the oscillation of the slow down roll.

52. In a sheet feeder, a delivery mechanism including a slow down adapted to retard the speed of the final delivery of the sheets, said slow down including a drop roll, and means to accurately determine the descent of the drop roll and consequently the functioning of the slow down comprising, a releasable latch including a pivoted lever, an adjusting screw at the free end portion of the lever, and a reciprocable push pin arranged to abut the adjusting screw and move the lever to release the latch.

53. In a sheet feeder including a delivery mechanism and sheet forwarding mechanism to pick off the top sheet of a pile and forward it to the delivery mechanism, said forwarding mechanism being stationary and the delivery mechanism being arranged to fold up, a sheet straightener for the delivery mechanism, a slow down roll for the delivery mechanism, means to actuate said sheet straightener and slow down roll including rocking levers and power means carried by the stationary forwarding mechanism to rock said levers, and links connecting said levers with the power means, said links having readily disengageable connections with the levers and the power means to enable quick detachment thereof for the purpose of folding up the delivery mechanism.

54. In a suction sheet feeder, a sheet forwarder comprising a suction cup on the end of a tube, a pair of pivotally mounted levers connected at their outer ends with the tube, the connection of one of the levers with the tube accommodating motion of the tube longitudinally with respect to the lever, and cam means to raise and lower said designated lever to effect engagement of the suction cup with a pile of sheets, and to effect longitudinal motion of the other lever to move the suction cup across the pile of sheets after it has picked up the top sheet to thereby move said top sheet off the pile.

55. In a suction sheet feeder, a suction member having a suction mouth to engage and grip the top sheet of a pile, means to mount the suction member for down and up motion to engage and lift the top sheet and for lateral motion to move the sheet flatwise with respect to the pile comprising, a first lever pivotally mounted and having a sliding connection with the suction member, a second lever having a pivotal connection with the suction member, and cam means to reciprocate the second mentioned lever.

56. In a suction sheet feeder, a suction member having a suction mouth to engage and grip the top sheet of a pile, means to mount the suction member for engagement with the top sheet of the pile, and for lateral motion across the pile to move the sheet off the pile, said means comprising a pivoted lever having a sliding connection with the suction member, cam means to raise and lower said pivoted lever, a link pivotally connected with the suction member, a second pivoted lever connected with the link, and cam means to actuate said second mentioned pivoted lever to reciprocate the link and shift the suction member laterally with respect to the top of the pile.

57. In a sheet feeding device, suction means mounted for movement into and out of engagement with the topmost sheet of a pile and for swinging movement to carry the sheet away from the pile, yieldable means for engaging the suction means with the topmost sheet, drive mechanism to actuate the suction means, said drive mechanism including a continuously operating driver and a releasable connection to said driver, and means for releasing said connection so that said yieldable means is free to engage the suction means with the pile.

58. In a sheet feeding device, suction means, means to create a suction at the suction means, means mounting the suction means for movement into and out of engagement with the topmost sheet of a pile and for swinging movement to convey a sheet picked up thereby from the pile, yieldable means to engage the suction means with the topmost sheet of the pile, power driven means to lift the suction means and swing the same, said power driven means including a continuously operating driver and a releasable connection thereto, and common means for cutting off the suction from the suction means and releasing said connection, whereby said yieldable means is free to engage and hold the suction means down on the pile.

59. In a sheet feeding device having sheet separating mechanism to separate individual sheets from a pile and a conveyer to carry sheets to a predetermined destination and having primary driving means continuously operating and continuously driven transmission means driving said sheet separating mechanism and conveyer from said primary driving means, means to successively remove the top sheet separated from the pile, said means comprising a suction cup, instrumentalities to effect engagement of the suction cup with the topmost sheet and to swing the suction cup away from the pile, and means to actuate said instrumentalities comprising a driver continuously operating with the primary driving means, and a releasable connection between said driver and said means to actuate said instrumentalities so that operation of the suction cup may be arrested without necessitating shutting down the drive for said sheet separating mechanism and conveyer.

60. In a sheet feeding device having sheet separating mechanism and means to convey sheets, drive means for said mechanism and said conveying means including gear trains and power transmission mechanism having substantial inertia and a continuously operating power shaft driving said drive means, a suction cup, means mounting the suction cup for engagement with the topmost sheet of a pile and for swinging movement to carry a sheet from the pile onto the sheet conveying means, instrumentalities to effect engagement of the suction cup with the topmost sheet and to swing the same away from the pile, means to drive said instrumentalities comprising a driver continuously operating with said gear train and power transmission mechanism, and a releasable connection between said driver and the mechanism for actuating the instrumentalities, means to create suction at the cup, and common means to release said connection and shut off suction from the cup so that the functioning of the suction cup may be arrested while the gear trains and power transmission mechanism having substantial inertia continues to run without interruption.

ELMER W. BELLUCHE.
FRANK R. BELLUCHE.